US010849129B2

(12) United States Patent
Uchiyama et al.

(10) Patent No.: US 10,849,129 B2
(45) Date of Patent: *Nov. 24, 2020

(54) COMMUNICATION CONTROL APPARATUS, COMMUNICATION CONTROL METHOD AND TERMINAL APPARATUS

(71) Applicant: Sony Corporation, Tokyo (JP)

(72) Inventors: Hiromasa Uchiyama, Kanagawa (JP); Ryota Kimura, Tokyo (JP); Ryo Sawai, Tokyo (JP); Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,199

(22) Filed: May 9, 2019

(65) Prior Publication Data

US 2019/0268896 A1 Aug. 29, 2019

Related U.S. Application Data

(63) Continuation of application No. 14/901,260, filed as application No. PCT/JP2014/062491 on May 9, 2014, now Pat. No. 10,327,248.

(30) Foreign Application Priority Data

Jul. 3, 2013 (JP) ................................. 2013-139511

(51) Int. Cl.
*H04W 72/04* (2009.01)
*H04W 72/08* (2009.01)
(Continued)

(52) U.S. Cl.
CPC ......... *H04W 72/048* (2013.01); *H04W 16/32* (2013.01); *H04W 64/00* (2013.01);
(Continued)

(58) Field of Classification Search
CPC ... H04W 72/048; H04W 72/04; H04W 72/08; H04W 72/082; H04W 72/085;
(Continued)

(56) References Cited

U.S. PATENT DOCUMENTS 6,125,278 A 9/2000 Wieczorek et al.
7,526,035 B2 * 4/2009 Suh ....................... H04L 1/0001
375/132

(Continued)

FOREIGN PATENT DOCUMENTS

CN 1761887 A 4/2006
CN 101772176 A 7/2010
(Continued)

OTHER PUBLICATIONS

International Search Report dated Jul. 29, 2014 in PCT/JP2014/062491.

(Continued)

*Primary Examiner* — Magdi Elhag
(74) *Attorney, Agent, or Firm* — Xsensus LLP

(57) ABSTRACT

A communication control apparatus including: an acquisition unit configured to acquire channel-related information related to a channel state of a terminal apparatus located within a cell, and position-related information related to a position of the terminal apparatus; and a generation unit configured to generate statistical information related to the channel state according to the position in the cell on the basis of the channel-related information and the position-related information. The statistical information is information used for assignment of a wireless resource in the cell. The apparatus can reduce the amount of the control information transmitted/received within the cell.

11 Claims, 26 Drawing Sheets

(51) Int. Cl.
*H04W 16/32* (2009.01)
*H04W 64/00* (2009.01)
*H04W 28/06* (2009.01)

(52) U.S. Cl.
CPC ........... *H04W 72/04* (2013.01); *H04W 72/08* (2013.01); *H04W 28/06* (2013.01); *H04W 72/0486* (2013.01)

(58) Field of Classification Search
CPC ... H04W 72/0453; H04W 24/10; H04W 4/02; H04W 16/32; H04W 28/08; H04W 64/00
See application file for complete search history.

(56) References Cited

U.S. PATENT DOCUMENTS

| | | | |
|---|---|---|---|
| 8,098,590 B2* | 1/2012 | Catovic | H04W 24/08 370/252 |
| 8,391,248 B2 | 3/2013 | Ferrato et al. | |
| 9,338,747 B1 | 5/2016 | Parthasarathy et al. | |
| 2003/0022656 A1 | 1/2003 | Hinnant et al. | |
| 2004/0160365 A1 | 8/2004 | Riley et al. | |
| 2007/0014263 A1 | 1/2007 | Ferrato et al. | |
| 2007/0218880 A1* | 9/2007 | Felter | H04W 16/18 455/414.1 |
| 2008/0279153 A1 | 11/2008 | Xie et al. | |
| 2009/0310501 A1 | 12/2009 | Catovic | |
| 2010/0210213 A1* | 8/2010 | Pawar | H04L 5/0044 455/62 |
| 2011/0201277 A1 | 8/2011 | Eguchi | |
| 2011/0280205 A1 | 11/2011 | Qin et al. | |
| 2012/0231826 A1 | 9/2012 | Koorapaty et al. | |
| 2013/0136027 A1* | 5/2013 | Matsuo | H04W 24/10 370/252 |

FOREIGN PATENT DOCUMENTS

| | | |
|---|---|---|
| EP | 2373109 A1 | 10/2011 |
| JP | 7-307972 A | 11/1995 |
| JP | 2010-114779 A | 5/2010 |
| JP | 2011-166583 A | 8/2011 |
| JP | 2012-186545 A | 9/2012 |
| WO | 00/07384 A1 | 2/2000 |

OTHER PUBLICATIONS

Chinese Office Action dated Jun. 29, 2018 in Chinese Application No. 2018062602139980.

Extended Search Report dated Feb. 9, 2017 in European Patent Application No. 14820083.5.

* cited by examiner

COMMUNICATION CONTROL APPARATUS, COMMUNICATION CONTROL METHOD AND TERMINAL APPARATUS

CROSS-REFERENCE TO RELATED APPLICATIONS

This application is a continuation of U.S. application Ser. No. 14/901,260 filed Dec. 28, 2015, which is based on PCT filing PCT/JP2014/062491 filed May 9, 2014, and claims priority to JP 2013-139511 filed on Jul. 3, 2013, the entire contents of each are incorporated herein by reference.

TECHNICAL FIELD

The present disclosure relates to a communication control apparatus, a communication control method, and a terminal apparatus.

BACKGROUND ART

In recent years, communication systems of a cellular scheme such as Long Term Evolution (LTE) and Worldwide Interoperability for Microwave Access (WiMAX) have been widely used. In the communication systems of the cellular scheme, a wireless resource used for wireless communication is assigned to a terminal apparatus.

In the assignment of the wireless resource, a channel state between a base station and the terminal apparatus is considered. Specifically, in the LTE, channel state information (CSI) on a channel state between an evolved node B (eNB) and user equipment (UE) is considered. The CSI is provided for the eNB by the UE.

Moreover, as technology related to the assignment of the wireless resource, there has been disclosed, in a digital cordless telephone system, technology for assigning a call channel on the basis of statistical data (number of assignments) of call channel assignment (see, for example, Patent Literature 1).

CITATION LIST

Patent Literature

Patent Literature 1: JP H7-307972A

SUMMARY OF INVENTION

Technical Problem

Meanwhile, in the communication systems of the cellular scheme, it is desirable that control information transmitted/received between the base station and the terminal apparatus is further reduced so that more wireless resources can be used for transmission/reception of data. For example, it is desirable that the amount of the channel state information (for example, the CSI) considered in the assignment of the wireless resource is reduced as much as possible.

However, for example, in the communication systems of the cellular scheme, as the technology disclosed in Patent Literature 1, even if the number of assignments of the wireless resource (call channel) is accumulated, it is impossible to reduce the amount of the channel state information (for example, the CSI). Further, in the communication systems of the cellular scheme, since the channel state between the base station and the terminal apparatus differs depending on a position of the terminal apparatus within a cell, as the technology disclosed in Patent Literature 1, even if there is statistical information for each wireless resource (call channel), it is difficult to use the information for the assignment of the wireless resource.

Therefore, it is desirable to provide a system capable of further reducing the amount of the control information transmitted/received within the cell.

Solution to Problem

According to the present disclosure, there is provided a communication control apparatus including: an acquisition unit configured to acquire channel-related information related to a channel state of a terminal apparatus located within a cell, and position-related information related to a position of the terminal apparatus; and a generation unit configured to generate statistical information related to the channel state according to the position in the cell on the basis of the channel-related information and the position-related information. The statistical information is information used for assignment of a wireless resource in the cell.

According to the present disclosure, there is provided a communication control method including: acquiring channel-related information related to a channel state of a terminal apparatus located within a cell, and position-related information related to a position of the terminal apparatus; and generating statistical information related to the channel state according to the position in the cell on the basis of the channel-related information and the position-related information. The statistical information is information used for assignment of a wireless resource in the cell.

According to the present disclosure, there is provided a communication control apparatus including: an acquisition unit configured to acquire statistical information related to a channel state according to a position in a cell; and an assignment unit configured to perform assignment of a wireless resource in the cell on the basis of the statistical information.

According to the present disclosure, there is provided a communication control method including: acquiring statistical information related to a channel state according to a position in a cell; and performing assignment of a wireless resource in the cell on the basis of the statistical information.

According to the present disclosure, there is provided a terminal apparatus including: an acquisition unit configured to acquire channel-related information related to a channel state of the terminal apparatus when the terminal apparatus is located within a cell, and position-related information related to a position of the terminal apparatus; and a providing unit configured to provide a base station with the channel-related information and the position-related information. The channel-related information and the position-related information are information used for generating statistical information related to the channel state according to the position in the cell. The statistical information is information used for assignment of a wireless resource in the cell.

According to the present disclosure, there is provided an information processing apparatus configured to control a terminal apparatus, the information processing apparatus including: a memory configured to store a predetermined program; and one or more processors capable of executing the predetermined program. The predetermined program is a program for acquiring channel-related information related to a channel state of the terminal apparatus when the terminal apparatus is located within a cell, and position-related information related to a position of the terminal apparatus, and providing a base station with the channel-related information and the position-related information. The channel-related information and the position-related information are information used for generating statistical information related to the channel state according to the position in the cell. The statistical information is information used for assignment of a wireless resource in the cell.

Effects of Invention

As described above, according to the present disclosure, it becomes possible to further reduce the amount of the control information transmitted/received within the cell.

DESCRIPTION OF EMBODIMENTS

Hereinafter, preferred embodiments of the present invention will be described in detail with reference to the appended drawings. Moreover, in this specification and the drawings, elements that have substantially the same function and structure are denoted with the same reference symbols, and repeated explanation is omitted.

Moreover, description will be provided in the following order.
1. Configuration of Communication System
2. Configuration of Networking Entity (Ne)
3. Configuration of eNB
4. Configuration of UE
5. Flow of Processing
6. Modifications
6-1. First Modification
6-2. Second Modification
6-3. Third Modification
7. Applications
7-1. Application related to Network Entity (NE)
7-2. Application related to eNB
7-3. Application related to UE
8. Summary

1. SCHEMATIC CONFIGURATION OF COMMUNICATION SYSTEM

Figure 1:
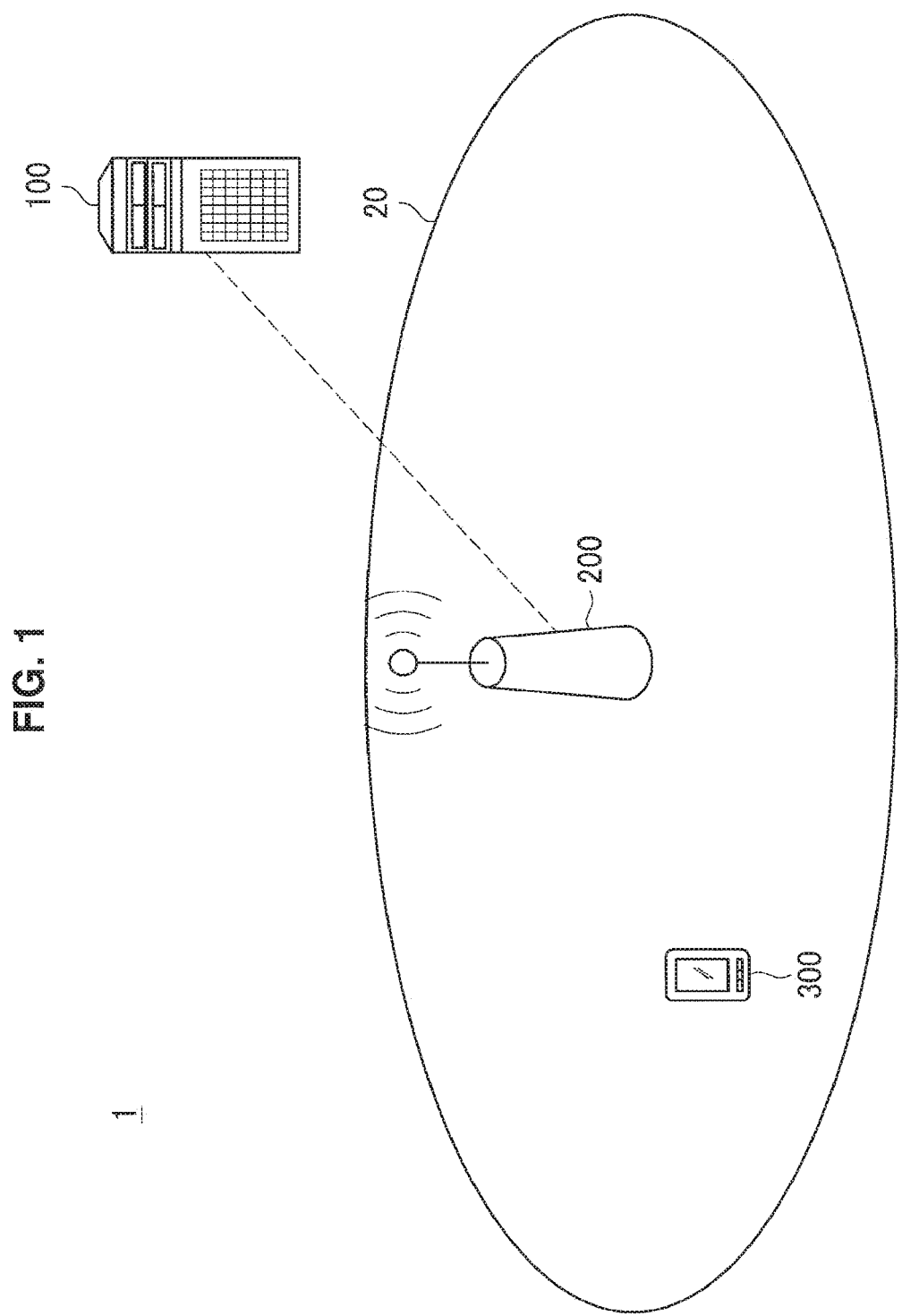
FIG. 1 is an explanatory diagram for explaining an example of a schematic configuration of a communication system according to an embodiment of the present disclosure.

First, with reference to FIG. 1, a schematic configuration of a communication system 1 according to an embodiment of the present disclosure will be described. FIG. 1 is an explanatory diagram for explaining an example of the schematic configuration of the communication system 1 according to an embodiment of the present disclosure. With reference to FIG. 1, the communication system 1 includes a network entity 100, an evolved node B (eNB) 200, and user equipment (UE) 300. In this example, the communication system 1 is a system that is accordance with LTE, LTE-Advanced, or a communication scheme that conforms with them.

The network entity (NE) 100 is an apparatus that controls one or more eNBs 200. For example, the NE 100 is a node of a core network. Specifically, the core network is an evolved packet core (EPC), and the node may be an existing node such as a mobility management entity (MME), and a serving gateway (S-GW), or a new node newly added.

The eNB 200 performs wireless communication with one or more UE 300 positioned within a cell 20. For example, the eNB 200 assigns a wireless resource to the UE 300 located within the cell, and uses the assigned wireless resource to perform wireless communication with the UE 300. Moreover, when the eNB 200 assigns the wireless resource to the UE 300, it considers a channel state between the eNB 200 and the UE 300.

The UE 300, when being located within the cell 20, performs wireless communication with the eNB 200. For example, when the eNB 200 assigns the wireless resource to the UE 300, the UE 300 uses the assigned wireless resource to perform wireless communication with the eNB 200. Moreover, the UE 300 provides the eNB 200 with information related to the channel state between the eNB 200 and the UE 300.

2. CONFIGURATION OF NETWORK ENTITY (NE)

Figure 2:
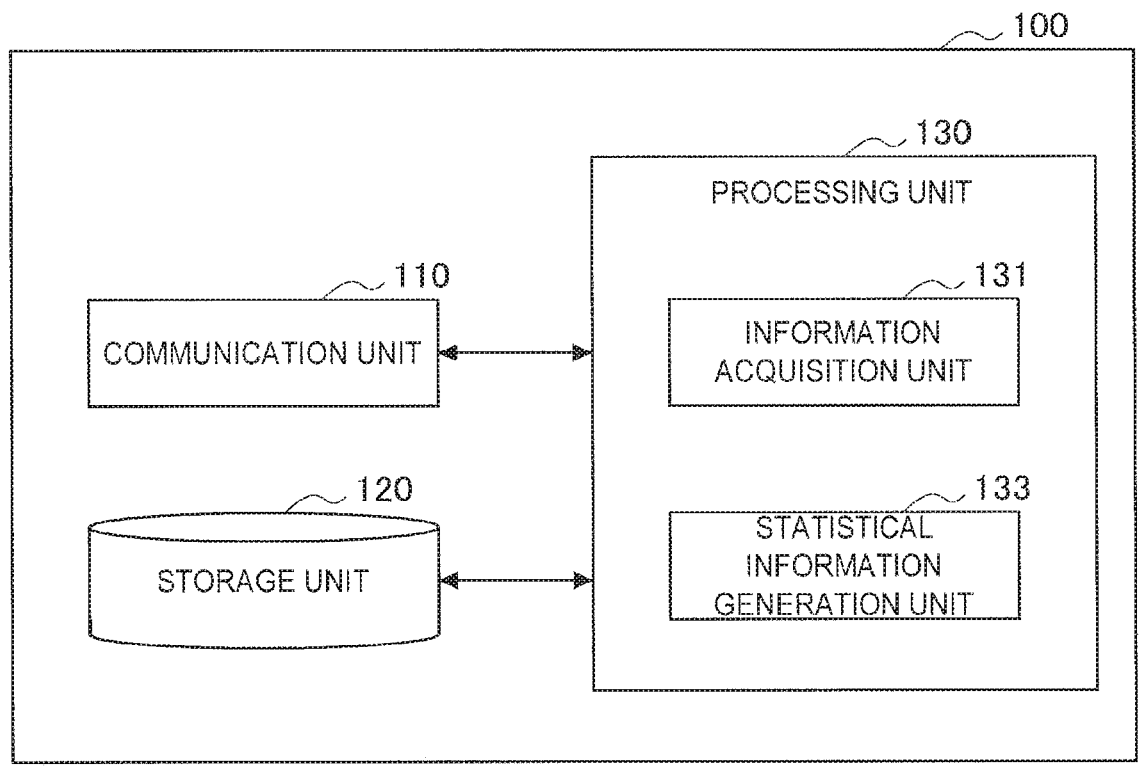
FIG. 2 is a block diagram illustrating an example of a configuration of a network entity (NE) according to an embodiment.
Figure 3:
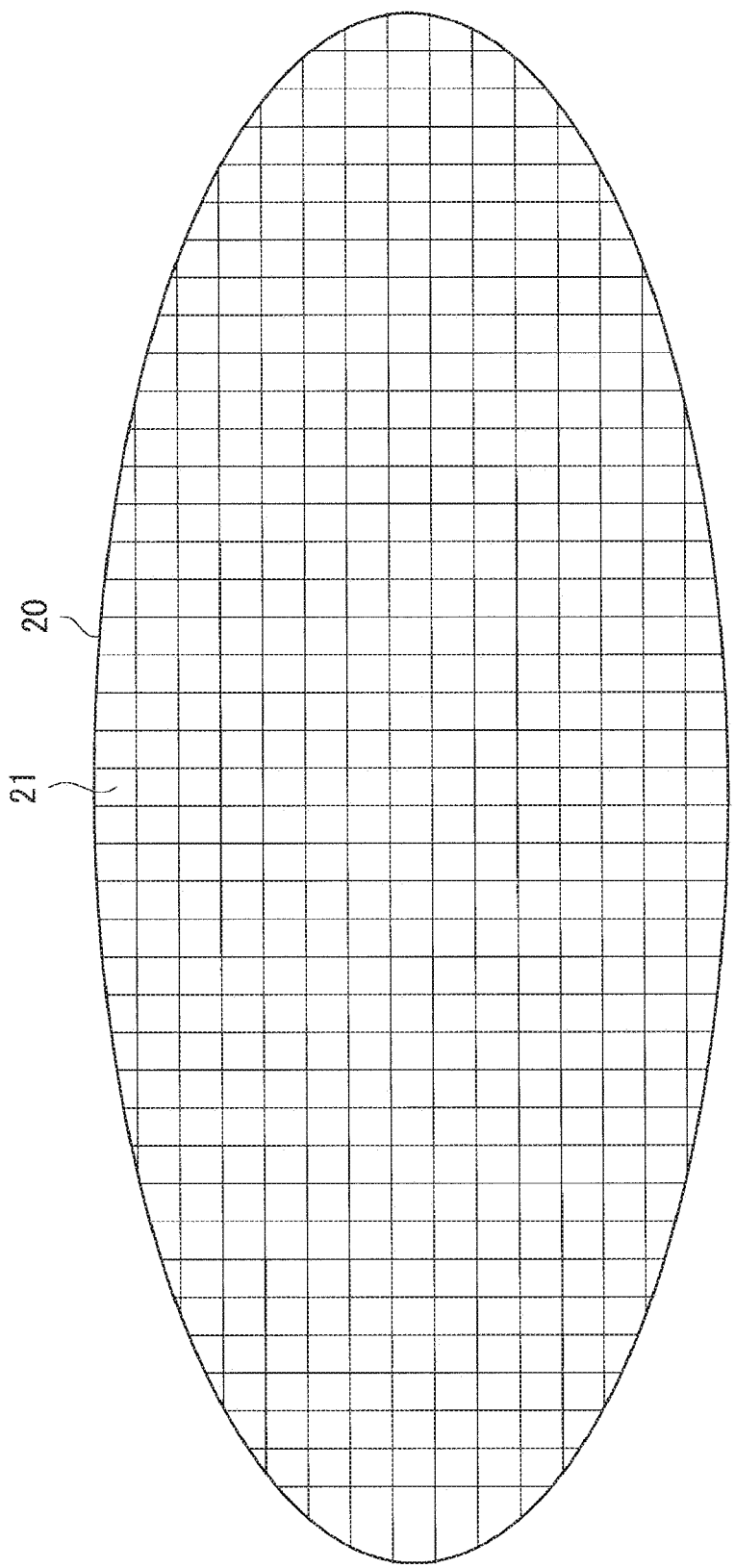
FIG. 3 is an explanatory diagram for explaining an example of regions each where statistical information related to a channel state is generated.
Figure 4:
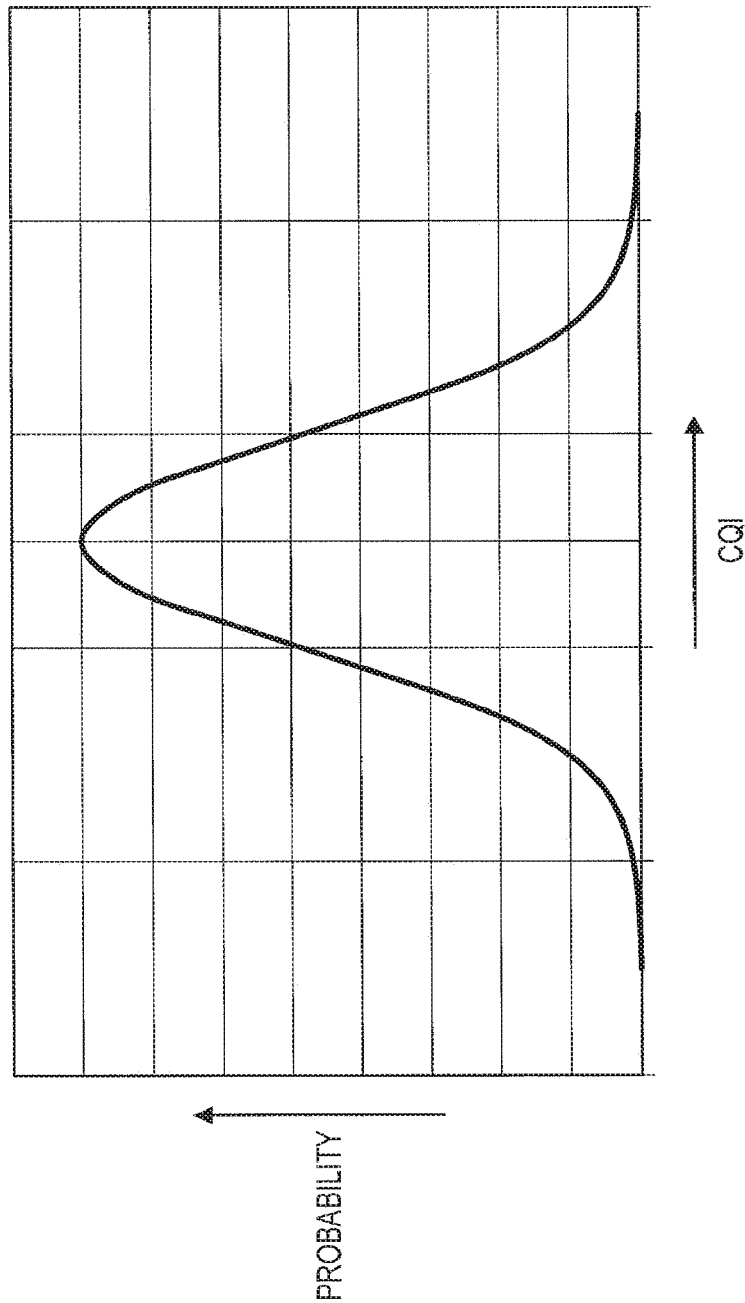
FIG. 4 is an explanatory diagram for explaining an example of a probability density function of CQI.

With reference to FIG. 2 to FIG. 4, an example of a configuration of the network entity (NE) 100 according to an embodiment of the present disclosure will be described. FIG. 2 is a block diagram illustrating an example of a configuration of the NE 100 according to an embodiment of the present disclosure. With reference to FIG. 2, the NE 100 includes a communication unit 110, a storage unit 120, and a processing unit 130.

(Communication Unit 110)

The communication unit 110 communicates with another communication node. For example, the communication unit 110 communicates with the eNB 200. Further, for example, the communication unit 110 communicates with another communication node (for example, the MME, S-GW, or the like) in the core network.

(Storage Unit 120)

The storage unit 120 stores a program and data for operation of the NE 100.

(Processing Unit 130)

The processing unit 130 provides various functions of the NE 100. The processing unit 130 includes an information acquisition unit 131, and a statistical information generation unit 133.

(Information Acquisition Unit 131)

Acquisition of Channel-Related Information

The information acquisition unit 131 acquires channel-related information related to a channel state of the UE 300 located within the cell 20.

For example, the channel-related information is a portion or an entirety of channel state information (CSI) provided by the UE 300. For example, the CSI includes a channel quality indicator, a precoding matrix indicator (PMI), a precoding type indicator (PTI), and a rank indicator (RI). The CQI is measured using a reference signal transmitted by the eNB 200, and indicates quality of a channel state. Further, the PMI indicates a precoding matrix in a multiple-input and multiple-output (MIMO) communication. Further, the PTI indicates a precoding type in the MIMO communication. The RI indicates a rank in the MIMO communication. Moreover, when the eNB 200 performs wireless communication with the UE 300, normally, it determines a communication scheme, assigns a wireless resource, and so on, on the basis of the CSI provided by the UE 300.

Acquisition of Position-Related Information

Furthermore, the information acquisition unit 131 acquires position-related information relating to a position of the UE 300.

For example, the position-related information is position information indicating a position of the UE 300. More specifically, for example, the position-related information is position information indicating a position of the UE 300 when the measurement for obtaining the channel-related information (for example, the CSI) has been performed. The position indicated by the position information is, for example, any of latitude and longitude, a distance and an angle from the eNB 200, and a relative position to any specific point, and the like. The position indicated by position information may be a position of a two-dimensional plane, or a position of a three-dimensional space.

Moreover, the position of the UE 300 may be measured using any of various positioning methods such as assisted global navigation satellite systems (A-GNSS), an observed time difference of arrival (OTDOA), an enhanced cell ID (E-CID), and a global positioning system (GPS). After Release 9 of the third generation partnership project (3GPP), such various positioning methods have been supported according to the introduction of a localization service function.

Specific Acquisition Method

As described above, the information acquisition unit 131 acquires the channel-related information (for example, the CSI). Further, for example, the information acquisition unit 131 additionally acquires the position-related information (for example, the position information) corresponding to the channel-related information.

Specifically, for example, the channel-related information and the position-related information is provided for the eNB 200 by the UE 300. The eNB 200 then provides the channel-related information and the position-related information for the NE 100. Then, the information acquisition unit 131 acquires the channel-related information and the position-related information via the communication unit 110.

Moreover, the channel-related information and the position-related information may be (periodically or non-periodically) provided for the NE 100 by the eNB 200 autonomously, or may be provided for the NE 100 by the eNB 200 according to a (periodical or non-periodical) request of the NW 100. Further, when the channel-related information and the position-related information is provided according to the request of the NW 100, the request may be performed using as a target the channel-related information according to a specific position within the cell 20 (or a specific region included in the cell 20). Then, the eNB 200 may provide the NE 100 with the channel-related information corresponding to the specific position (or the specific region), according to the request.

(Statistical Information Generation Unit 133)

Statistical Information

The statistical information generation unit 133 generates statistical information related to a channel state according to a position in the cell 20 on the basis of the channel-related information and the position-related information. In this case, the statistical information is information used for the wireless resource assignment in the cell 20.

Region Statistical Information

For example, the cell 20 includes a plurality of regions. As an example, the cell 20 is divided into a plurality of (any) regions. The plurality of regions each include one or more positions within the cell 20. Then, the statistical information includes the region statistical information relating to a channel state in each region included in the cell 20. That is, the statistical information generation unit 133 generates the region statistical information related to a channel state in each region included in the cell 20.

Specifically, for example, the statistical information generation unit 133 specifies the region corresponding to the channel-related information among the plurality of regions, on the basis of the position-related information (for example, the position information) corresponding to the acquired channel-related information. The statistical information generation unit 133 then accumulates the channel-related information in the region unit. Thereafter, the statistical information generation unit 133 generates the region statistical information for each region on the basis of the channel-related information accumulated in the region unit. For example, on the basis of the channel-related information corresponding to a first region (that is, the channel-related information obtained by the measurement within the first region), the statistical information generation unit 133 generates the region statistical information related to a channel state in the first region (that is, the region statistical information in the first region). This point will be specifically described below with reference to FIG. 3.

FIG. 3 is an explanatory diagram for explaining an example of the regions each where the statistical information related to a channel state is generated. With reference to FIG. 3, the cell 20 is shown. The cell 20 includes a plurality of regions 21. For example, the statistical information generation unit 133 generates the statistical information related to a channel state in the region 21 (region statistical information) for each region 21.

Since a propagation path, reception power, or the like of a wireless wave is changed depending on a position within the cell 20, the channel state may largely differ depending on the position within the cell 20. Therefore, the generation of the region statistical information as described above provides the statistical information related to the channel state according to the position. That is, the statistical information having higher reliability is obtained. Therefore, for example, it becomes possible to more properly assign the wireless resource on the basis of the statistical information, or to more frequently assign the wireless resource on the basis of the statistical information. Moreover, the finer the granularity of the region, the higher the reliability of the statistical information.

Furthermore, if it becomes possible to assign the wireless resource on the basis of the statistical information, for example, it becomes possible to eliminate the need for acquiring new channel-related information. Therefore, it becomes possible to reduce the frequency of providing the channel-related information by the UE 300. That is, it becomes possible to further reduce the amount of the control information transmitted/received within the cell 20. As a result, system capacity, throughput and the like of the communication system 1 can be increased.

Generation of Statistical Information based on Probability Distribution

For example, the statistical information generation unit 133 generates the region statistical information on the basis of a probability distribution of the channel-related information corresponding to each region included in the cell 20.

For example, the channel-related information is a portion or an entirety of the CSI. As an example, the channel-related information includes the CQI. In this case, the statistical information generation unit 133 generates the region statistical information on the CQI corresponding to each region on the basis of the probability distribution of the CQI corresponding to each region.

As a first specific method, the statistical information generation unit 133 creates a probability density function of the CQI indicating the probability distribution of the CQI to generate the region statistical information on the CQI from the probability density function. The probability density function is, for example, when following a normal distribution, expressed as follows.

$$f(H(p)) = \frac{1}{\sqrt{2\pi\sigma^2}} \exp\left\{-\frac{1}{2}\left(\frac{H(p) - \overline{H(p)}}{\sigma}\right)^2\right\}$$ [Equation 1]

p indicates a region (or a position) included in the cell 10. Further, H(p) indicates a channel state corresponding to p. In this case, H(p) indicates the CQI corresponding to p. f(H(p)) indicates the probability density function of H(p). A specific example of such a probability density function will be described with reference to FIG. 4.

FIG. 4 is an explanatory diagram for explaining an example of the probability density function of the CQI. With reference to FIG. 4, a graph of the probability density function of the CQI is shown. That is, the probability to the CQI is shown. For example, the region statistical information (statistical information for each region) is generated from such a probability density function.

Furthermore, the statistical information is, for example, an average value in the probability distribution. In this example, the statistical information is the average value in the probability distribution of the CQI (that is, the average value of the CQI). In this case, when the number of candidates of the CQI (for example, 16 pieces of 0 to 15) is N, and each candidate of the CQI is $H(p)_i$, and the probability for each candidate of the CQI is $f(H(p))_i$, the statistical information is expressed, for example, as follows.

$$\overline{H(p)} = \sum_{i=1}^{N} H(p)_i \cdot f(H(p)_i)$$ [Equation 2]

Moreover, the statistical information may be not the average value in the probability distribution, but a value obtained from the average value (for example, a value closest to the average value among the actual values 0 to 15 of the CQI). Further, the statistical information may be another value obtained from the probability density function. Specifically, the statistical information may be a value obtained from the probability density function and a predetermined probability (80%). This point will be specifically described with reference to FIG. 5.

Figure 5:
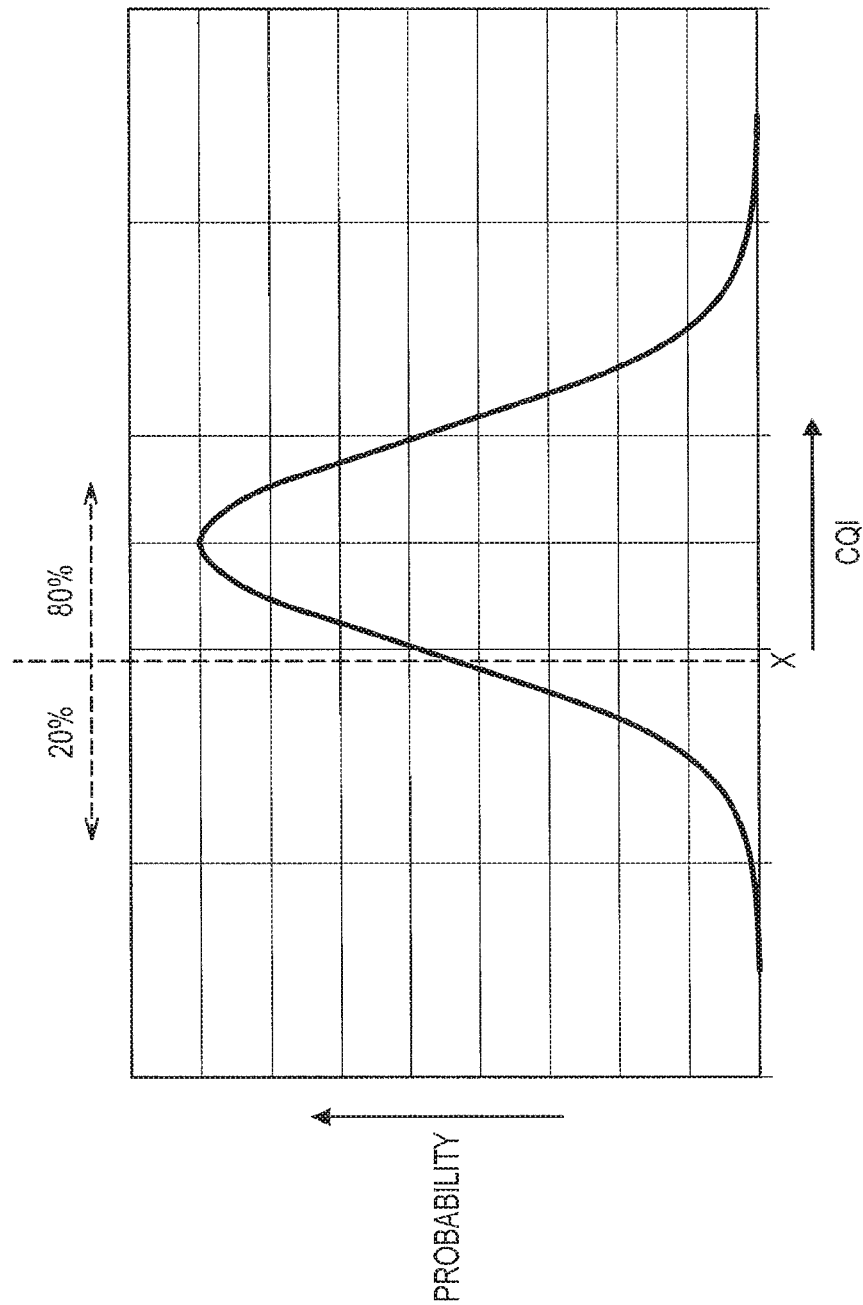
FIG. 5 is an explanatory diagram for explaining an example of region statistical information.

FIG. 5 is an explanatory diagram for explaining an example of the region statistical information. With reference to FIG. 5, similarly to FIG. 4, a graph of the probability density function of the CQI is shown. First, a predetermined probability (for example, 80%) is set. Then, a threshold X of the CQI segregating a region of 80% where the CQI is higher and a region of 20% where the CQI is lower is calculated in the probability density function. Then, the smallest number among the numbers more than or equal to the threshold X among the actual values 0 to 15 of the CQI can be generated as the region statistical information.

Furthermore, as a second specific sample, the statistical information generation unit 133 may generate the CQI having the highest probability in the probability distribution of the CQI, as the region statistical information. For example, the CQI has any value of 0 to 15. The statistical information generation unit 133 may generate, as the region statistical information, a value having the highest probability among 0 to 15 (that is, a value having a high number of acquisitions). As an example, when the probability that the CQI is "9" is 60% in a certain region, "9" may be generated as the region statistical information on the CQI for the certain region.

For example, as described above, the statistical information generation unit 133 generates the region statistical information on the CQI. An example of the generation result of such region statistical information will be described with reference to FIG. 6 and FIG. 7.

Figure 6:
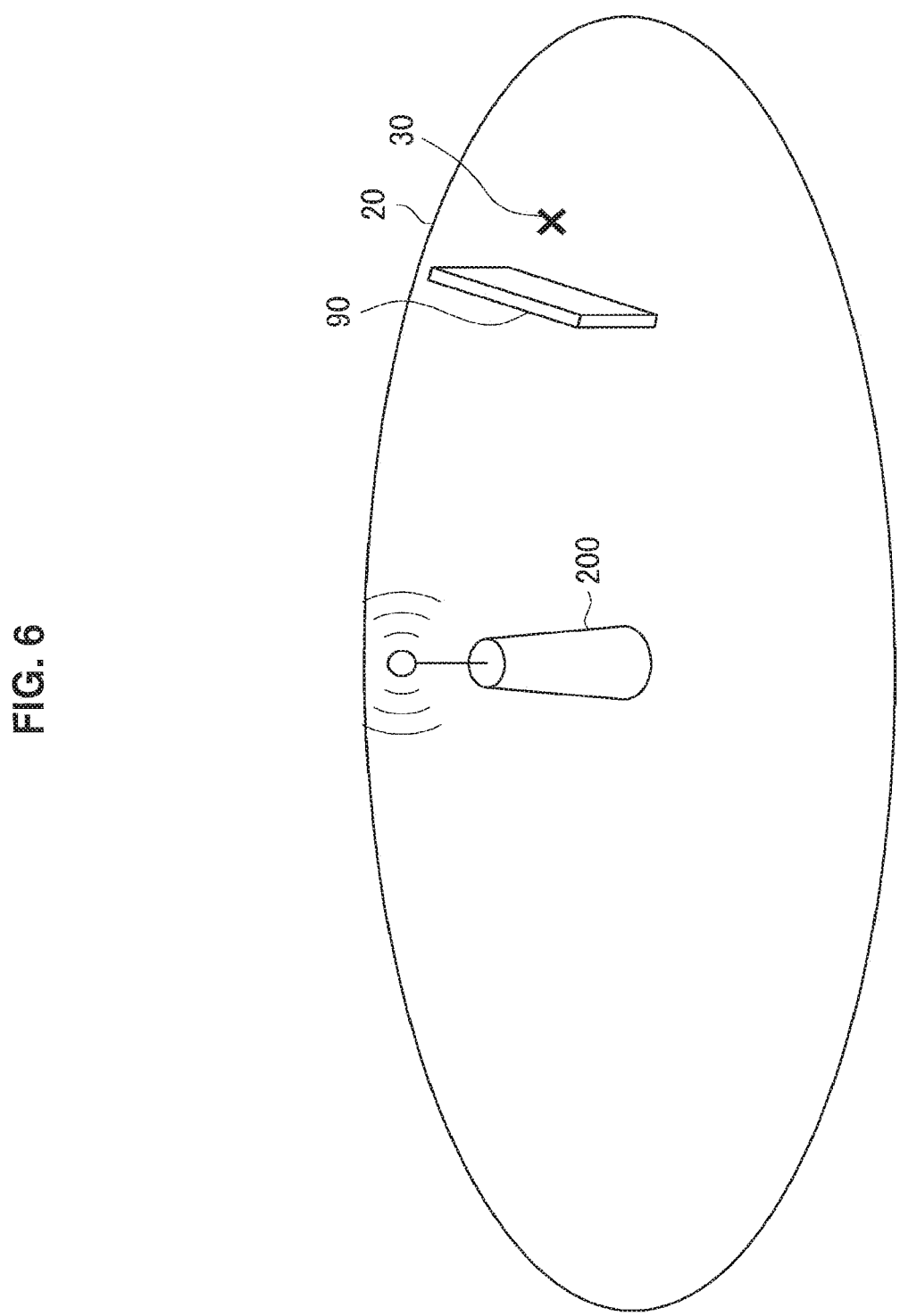
FIG. 6 is an explanatory diagram for explaining an example of a situation of a cell.

FIG. 6 is an explanatory diagram for explaining an example of a situation of the cell 20. With reference to FIG. 6, the cell 20 and the eNB 200 are shown. Further, a shielding object 90 for wireless communication of the eNB 200 exists in the cell 20. Therefore, for example, when the UE 300 is located at a position 30, a channel state between the UE 300 and the eNB 200 may deteriorate.

Figure 7:
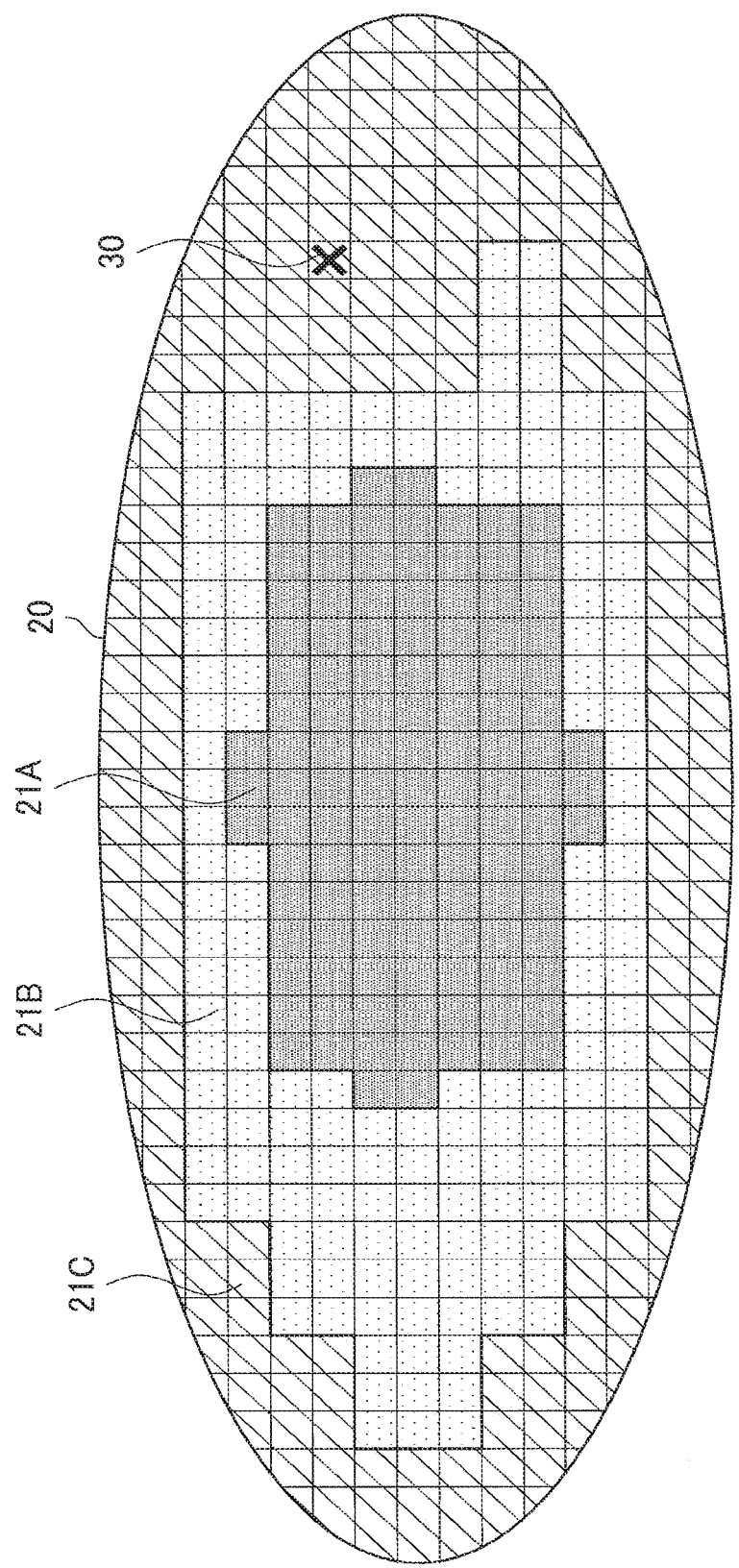
FIG. 7 is an explanatory diagram for explaining an example of a generation result of the region statistic information under the situation of the cell shown in FIG. 6.

FIG. 7 is an explanatory diagram for explaining an example of the generation result of the region statistic information under the situation of the cell 20 shown in FIG. 6. With reference to FIG. 7, similarly to FIG. 3, the cell 20 and the plurality of regions 21 included in the cell 20 are shown. Further, in FIG. 7, in order to indicate the generation result of the region statistical information, a pattern according to the generated region statistical information is added to each region 21. For example, for a region 21A, the region statistical information on the CQI having a large value (for example, 10<=x<=15) is generated. Further, for a region 21C, the region statistical information on the CQI having a small value (for example, 0<=x<5) is generated. Further, for a region 21B, the region statistical information on the CQI having another value (for example, 5<=x<10) is generated. Moreover, the region including the position 30 is the region 21C by the deterioration in the channel state due to the shielding object 90. For example, in this manner, a channel-related information map including the region statistical information for each region within the cell 20 can be generated as the statistical information related to the channel state according to the position in the cell 20.

As described above, the statistical information generation unit 133 generates the region statistical information on the basis of the probability distribution of the channel-related information corresponding to each region included in the cell 20. As an example, the example of the region statistical information on the CQI has been described, but the region statistical information may be generated using either the first specific example or the second specific example as described above, also for other information included in the channel-related information. For example, for the PMI, PTI and RI, as the second specific example described above, a value having the highest probability (that is, a value having a high number of acquisitions) may be generated as the region statistical information. Moreover, in place of generating the statistical information for each individual information such as the CQI, PMI, PTI and RI, the statistical information may be generated for each combination of the individual information, such as the combination of the CQI, PMI, PTI and RI. As an example, as the second specific example described above, the combination having the highest probability among the combinations of the CQI, PMI, PTI and RI may be generated as the region statistical information.

Reliability Information

For example, the statistical information generation unit 133 further generates reliability information related to reliability of the statistical information. Specifically, for example, the reliability information is reliability of the statistical information.

Region Reliability Information

For example, the reliability information includes region reliability information related to reliability of each region statistical information included in the statistical information. Specifically, for example, the region reliability information is reliability of each region statistical information.

As a first specific method, for example, the statistical information generation unit 133 uses dispersion related to the channel-related information used for the generation of the region statistical information to generate the region reliability information.

As an example, when the region statistical information on the CQI is given as an example, as described above, for example, the probability density function f(H(p)) of the CQI indicating the probability distribution of the CQI can be created. In this case, reliability R(p) of the region statistical information on the CQI is expressed by using the probability density function f(H(p)) of the CQI, for example, as dispersion as follows.

$$R(p) = \sum_{i=1}^{N} (H(p)_i - \overline{H(p)})^2 \cdot f(H(p)_i) \quad \text{[Equation 3]}$$

The dispersion (that is, the reliability) calculated in this manner indicates that, when the value is larger, variations in the region statistical information is small and the reliability of the region statistical information is higher.

Furthermore, as a second specific method, when the channel-related information (for example, the CQI) having the highest probability in the probability distribution of the channel-related information (for example, the CQI) is generated as the region statistical information, the statistical information generation unit 133 may generate the highest probability as the region reliability information.

As an example, in a certain region, the probability that the CQI is "9" is "60%", "9" may be generated as the region statistical information on the CQI for the certain region, and "60%" may be generated as the region reliability information related to the reliability of the region statistical information.

For example, as described above, the reliability information related to the reliability of the statistical information is generated. This makes it possible to properly judge whether or not the assignment of the wireless resource based on the statistical information is performed.

Furthermore, as described above, for example, the region reliability information related to the reliability of each region statistical information is generated. This makes it possible to judge whether or not the assignment of the wireless resource based on the statistical information is performed for each region. As a result, it becomes possible to perform the assignment having higher reliability.

Update of Reliability Information

For example, the statistical information generation unit 133 updates the reliability information on the basis of feedback information for wireless communication performed according to the assignment of the wireless resource based on the statistical information.

Specifically, for example, the feedback information includes information indicating success or failure of the wireless communication. As an example, the eNB 200 generates a feedback report as the feedback information in accordance with transmission/reception of ACK/NACK related to wireless communication between the eNB 200 and the UE 300. The feedback report includes information indicating success or failure of the reception. Further, the feedback report also includes, for example, information on the region corresponding to the region statistical information used for the assignment of the wireless resource for the wireless communication. The statistical information generation unit 133 updates the region reliability information on the basis of the feedback report from the eNB 200. Moreover, the feedback report may further include information such as the number of resendings of a hybrid automatic repeat request (HARQ) required until the success of the reception, and parameter information on a physical layer used until then (a transmission mode, the CQI, PMI, PTI, RI and the like).

Furthermore, for example, the statistical information generation unit 133 updates the reliability information so that, when the feedback information indicates the success of the wireless communication, the reliability of the statistical information becomes higher, or when the feedback information indicates the failure of the wireless communication, the reliability of the statistical information becomes lower. As an example, when the feedback report from the eNB 200 includes the information indicating the success of the reception, the statistical information generation unit 133 weights the corresponding region reliability information so that the reliability of the corresponding region statistical information becomes higher. Further, when the feedback report from the eNB 200 includes the information indicating the failure of the reception, the statistical information generation unit 133 weights the corresponding region reliability information so that the reliability of the corresponding region statistical information becomes lower.

The update of the reliability information as described above improves, for example, the accuracy of the reliability information. As a result, it becomes possible to more properly judge whether or not to perform the assignment of the wireless resource based on the statistical information.

Moreover, the statistical information generation unit 133 provides the eNB 200 with the generated statistical information and reliability information.

3. CONFIGURATION OF ENB

Figure 8:
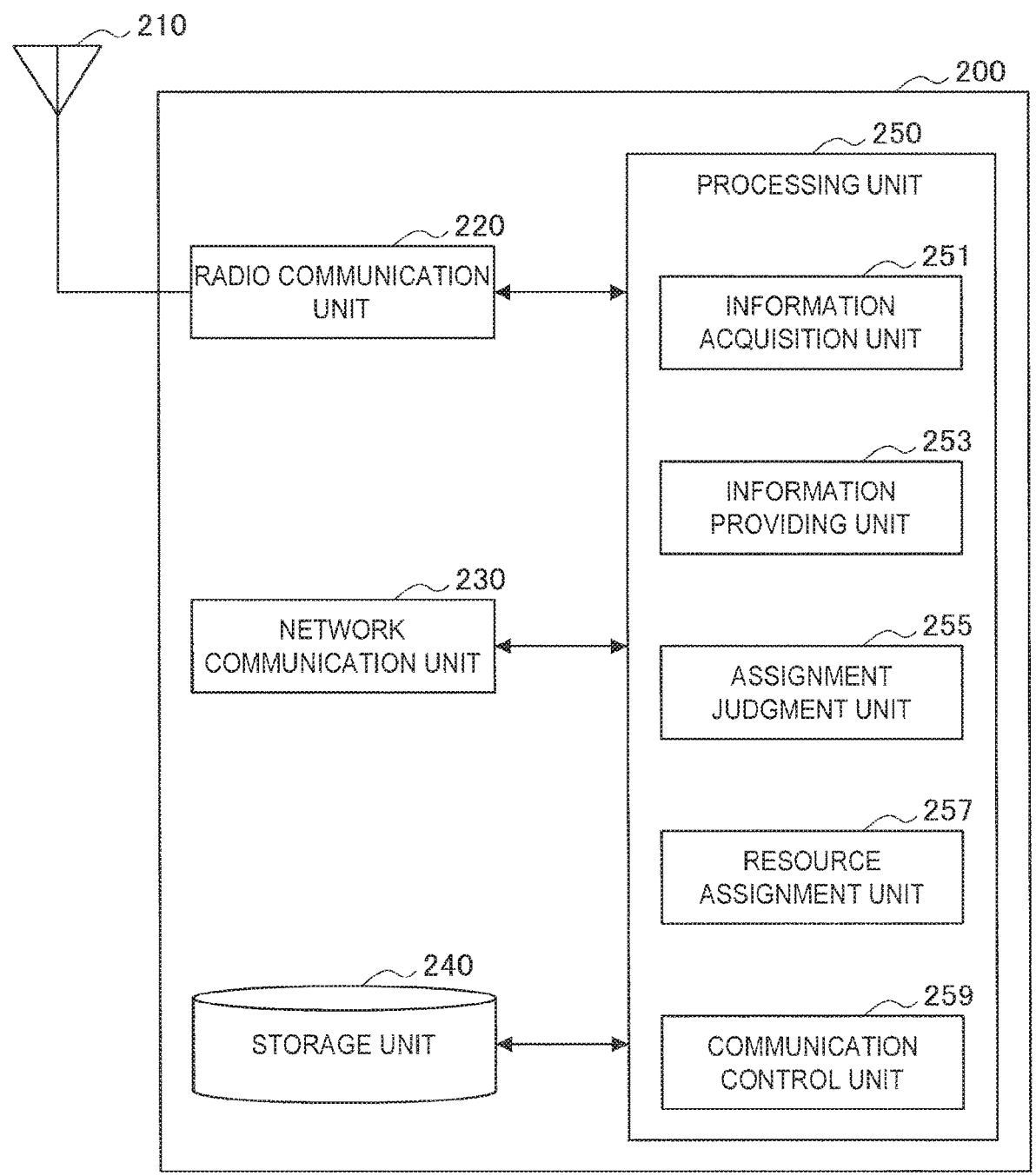
FIG. 8 is a block diagram illustrating an example of a configuration of an eNB according to an embodiment.

With reference to FIG. 8, an example of a configuration of the eNB 200 according to an embodiment of the present disclosure will be described. FIG. 8 is a block diagram illustrating an example of the configuration of the eNB according to an embodiment of the present disclosure. With reference to FIG. 8, the eNB 200 includes an antenna unit 210, a wireless communication unit 220, a network communication unit 230, a storage unit 240, and a processing unit 250.

(Antenna Unit 210)

The antenna unit 210 receives a wireless signal, and outputs the received wireless signal to the wireless communication unit 220. Further, the antenna unit 210 transmits a transmission signal outputted by the wireless communication unit 220.

(Wireless Communication Unit 220)

The wireless communication unit 220 performs wireless communication with the UE 300 located within a macro cell 20.

(Network Communication Unit 230)

The network communication unit 230 communicates with another communication node. For example, the network communication unit 230 communicates with the NE 100. Further, for example, the network communication unit 230 communicates with another node (for example, the MME, S-GW and the like) in the core network. For example, the network communication unit 230 communicates with another eNB 200.

(Storage Unit 240)

The storage unit 240 stores a program and data for the operation of the eNB 200.

(Processing Unit 250)

The processing unit 250 provides various functions of the eNB 200. The processing unit 250 includes an information acquisition unit 251, am information providing unit 253, an assignment judgment unit 255, a resource assignment unit 257, and a communication control unit 259.

(Information Acquisition Unit 251)

Statistical Information

The information acquisition unit 251 acquires the statistical information related to a channel state according to a position in the cell.

Specifically, for example, the NE 100 provides the eNB 200 with the statistical information. Then, the information acquisition unit 251 acquires the statistical information via the network communication unit 230.

Reliability Information

Furthermore, for example, the information acquisition unit 251 further acquires the reliability information related to the reliability of the statistical information.

Specifically, for example, the NE 100 provides the eNB 200 with the reliability information together with the statistical information. Then, the information acquisition unit 251 acquires the reliability information via the network communication unit 230.

Channel-related Information, Position-related Information

Furthermore, for example, the information acquisition unit 251 acquires the channel-related information related to the channel state of the UE 300 located within the cell 20, and the position-related information related to the position of the UE 300.

Specifically, for example, the information acquisition unit 251 requests the UE 300 to report the channel-related information (for example, the CSI) via the network communication unit 230. Then, the UE 300 provides the eNB 200 with the combination of the channel-related information and the position-related information. The information acquisition unit 251 then acquires the provided combination via the network communication unit 230.

(Information Providing Unit 253)

Channel-related Information, Position-related Information

The information providing unit 253 provides the NE 100 with the channel-related information and the position-related information. For example, the information providing unit 253 provides the NE 100 via the network communication unit 230 with the channel-related information and the position-related information acquired by the information acquisition unit 251.

Moreover, the information providing unit 253 may (periodically or non-periodically) provide the NE 100 with the channel-related information and the position-related information, autonomously, and may provide the NE 100 with the channel-related information and the position-related information according to a request from the NE 100. Further, when the channel-related information and the position-related information is provided for the NE 100 by the eBN 200 according to the request from the NW 100, the request may be a request for providing the channel-related information corresponding to a specific position within the cell 20 (or a specific region included in the cell 20). Then, the information providing unit 253 may provide the NE 100 with the channel-related information and the position-related information corresponding to the specific position according to the request.

Feedback Information

The information providing unit 253 provides the NE 100 with feedback information on wireless communication performed according to the assignment of the wireless resource based on the statistical information. For example, the feedback information includes information indicating success or failure of the wireless communication.

Specifically, for example, in accordance with transmission/reception of the ACK/NACK related to the wireless communication between the eNB 200 and the UE 300, the information providing unit 253 generates a feedback report as the feedback information. The feedback report includes information indicating success or failure of the reception. Further, the feedback report also includes, for example, information on the region corresponding to the region statistical information used for the assignment of the wireless resource for the wireless communication. Moreover, the feedback report may further include information such as the number of resendings of the HARQ required until the success of the reception, and parameter information on a physical layer used until then (a transmission mode, the CQI, PMI, PTI, RI and the like).

(Assignment Judgment Unit 255)

The assignment judgment unit 255 judges whether the assignment of the wireless resource in the cell 20 based on the statistical information is performed.

Judgment based on Traffic Amount

For example, the assignment judgment unit 255 judges whether the assignment based on the statistical information is performed on the basis of a traffic amount.

For example, the assignment judgment unit 255 judges whether the assignment based on the statistical information is performed at a level of the cell 20 on the basis of a traffic amount within the cell 20.

More specifically, for example, the assignment judgment unit 255 judges that the assignment based on the statistical information is performed at a level of the cell 20, when the traffic amount within the cell 20 exceeds a predetermined threshold. After that, for example, the assignment judgment unit 255 further judges whether the assignment based on the statistical information is performed at a level of the UE 300 (that is, for each individual UE 300 located within the cell 20). On the other hand, the assignment judgment unit 255 judges that the assignment based on the statistical information is not performed, when the traffic amount within the cell 20 does not exceed the predetermined threshold. In other words, the assignment judgment unit 255 judges that normal assignment of the wireless resource is performed for any UE 300.

Moreover, the assignment judgment unit 255, along with the judgment based on the traffic amount within the cell 20, or in place of the judgment, may judge whether the assignment based on the statistical information at a level of the UE 300 (that is, for each individual UE 300) on the basis of a traffic amount of the UE 300.

More specifically, for example, the assignment judgment unit 255 may judge that the assignment based on the statistical information is performed for the UE 300, when the traffic amount of the UE 300 exceeds a predetermined threshold. On the other hand, the assignment judgment unit 255 may judge that the assignment based on the statistical information is not performed for the UE 300, when the traffic amount of the UE 300 does not exceed the predetermined threshold. In other words, the assignment judgment unit 255 may judge that normal assignment of the wireless resource is performed for the UE 300.

For example, when the traffic amount is large, the assignment of the wireless resource based on the statistical information is performed by such judgment based on the traffic amount. Therefore, when the traffic amount is large, it becomes possible to further reduce the amount of the control signal (channel-related information) transmitted/received within the cell 20. That is, when the traffic amount is large, more wireless resources can be used for transmission/reception of data.

Judgment based on Movement State of UE

For example, the assignment judgment unit 255 judges whether the assignment based on the statistical information is performed on the basis of a movement state of the UE 300.

For example, the assignment judgment unit 255 judges whether the assignment based on the statistical information is performed at a level of the UE 300 (that is, for each individual UE 300) on the basis of a movement state of the UE 300. The movement state is, for example, a moving amount (or a moving speed) of the UE 300.

More specifically, for example, the assignment judgment unit 255 judges that the assignment based on the statistical information is not performed for the UE 300, when a moving amount of the UE 300 exceeds a predetermined threshold. In other words, the assignment judgment unit 255 judges that normal assignment of the wireless resource is performed for the UE 300. On the other hand, the assignment judgment unit 255 judges that the assignment based on the statistical information is performed for the UE 300, when the moving amount of the UE 300 does not exceed the predetermined threshold.

For example, when the UE 300 does not move significantly, the assignment of the wireless resource based on the statistical information is performed by such judgment based on the movement state of the UE 300. In other words, when the channel state for the UE 300 does not change significantly (that is, when the statistical information is particularly useful), the assignment of the wireless resource based on the statistical information is performed. Accordingly, it becomes possible to further reduce the amount of the control signal (channel-related information) provided by the UE 300, while maintaining the accuracy of the assignment of the wireless resource.

Moreover, the moving amount of the UE 300 may be assumed by the eNB 200, or may be provided for the eNB 200 by the UE 300. The eNB 200 can assume the moving amount of the UE 300, for example, by tracking a position of the UE 300.

Judgment based on Reliability Information

For example, the assignment judgment unit 255 judges whether the assignment based on the statistical information is performed on the basis of the reliability information related to reliability of the statistical information.

For example, the assignment judgment unit 255 judges whether the assignment based on the statistical information is performed at a level of the UE 300 (that is, for each individual UE 300) on the basis of the region reliability information related to reliability of the region statistical information.

More specifically, for example, the assignment judgment unit 255 specifies the region within the cell 20 corresponding to a position of the UE 300. Then, the assignment judgment unit 255 judges that the assignment based on the statistical information is performed for the UE 300, when the region reliability information (for example, the reliability) corresponding to the specified region exceeds a predetermined threshold. On the other hand, the assignment judgment unit 255 judges that the assignment based on the statistical information is not performed for the UE 300, when the region reliability information (for example, the reliability) corresponding to the specified region does not exceed the predetermined threshold. In other words, the assignment judgment unit 255 judges that normal assignment of the wireless resource is performed for the UE 300.

With such judgment based on the reliability information, for example, when the reliability of the statistical information is high, the assignment of the wireless resource based on the statistical information is performed, and when the reliability of the statistical information is low, the assignment of the wireless resource based on the statistical information is not performed. Accordingly, it becomes possible to further reduce the amount of the control signal (channel-related information) provided by the UE 300 while maintaining the accuracy of the assignment of the wireless resource.

(Resource Assignment Unit 257)

The resource assignment unit 257 performs the assignment of the wireless resource in the cell 20.

Especially in an embodiment according to the present disclosure, the resource assignment unit 257 performs the assignment of the wireless resource in the cell 20 on the basis of the statistical information.

For example, the resource assignment unit 257 performs the assignment based on the statistical information, when it is judged that the assignment based on the statistical information is performed. More specifically, for example, the resource assignment unit 257 performs the assignment of the wireless resource based on the statistical information for the UE 300, when it is judged that the assignment based on the statistical information is performed for the UE 300. Moreover, when it is judged that the assignment based on the statistical information is not performed, (or normal assignment of the wireless resource is performed) for the UE 300, the resource assignment unit 257 performs normal assignment of the wireless resource for the UE 300.

More specifically, for example, the resource assignment unit 257 specifies the region within the cell 20 corresponding to a position of the UE 300. Then, the resource assignment unit 257 performs the assignment of the wireless resource in the cell 20 on the basis of the region statistical information corresponding to the specified region. Moreover, the position of the UE 300 may be assumed by the eNB 200, or may be notified to the eNB 200 by the UE 300.

For example, the region statistical information is the statistical information on the CSI for each region, and includes the statistical information on the CQI for each region. As an example, the resource assignment unit 257 determines modulation order and an encoding rate on the basis of the statistical information on the CQI. Then, the resource assignment unit 257 determines a transport block size (TBS) on the basis of the modulation order and the encoding rate, and determines a data size of the wireless resource on the basis of the TBS. After that, the resource assignment unit 257 assigns the wireless resource corresponding to the data size to the UE 300.

As described above, the assignment of the wireless resource based on the statistical information is performed. This can possibly eliminate the need for acquiring new channel-related information. Accordingly, for example, it becomes possible to reduce a frequency of providing the channel-related information by the UE 300. That is, it becomes possible to further reduce the amount of the control information transmitted/received within the cell 20.

Moreover, for example, the resource assignment unit 257 notifies the UE 300 of resource assignment information (that is, information on the assigned wireless resource) via the wireless communication unit 220.

(Communication Control Unit 259)

The communication control unit 259 controls wireless communication by the eNB 200. For example, the communication control unit 259 allows the wireless communication unit 220 to perform wireless communication with the UE 300 by using the assigned wireless resource.

4. CONFIGURATION OF UE

Figure 9:
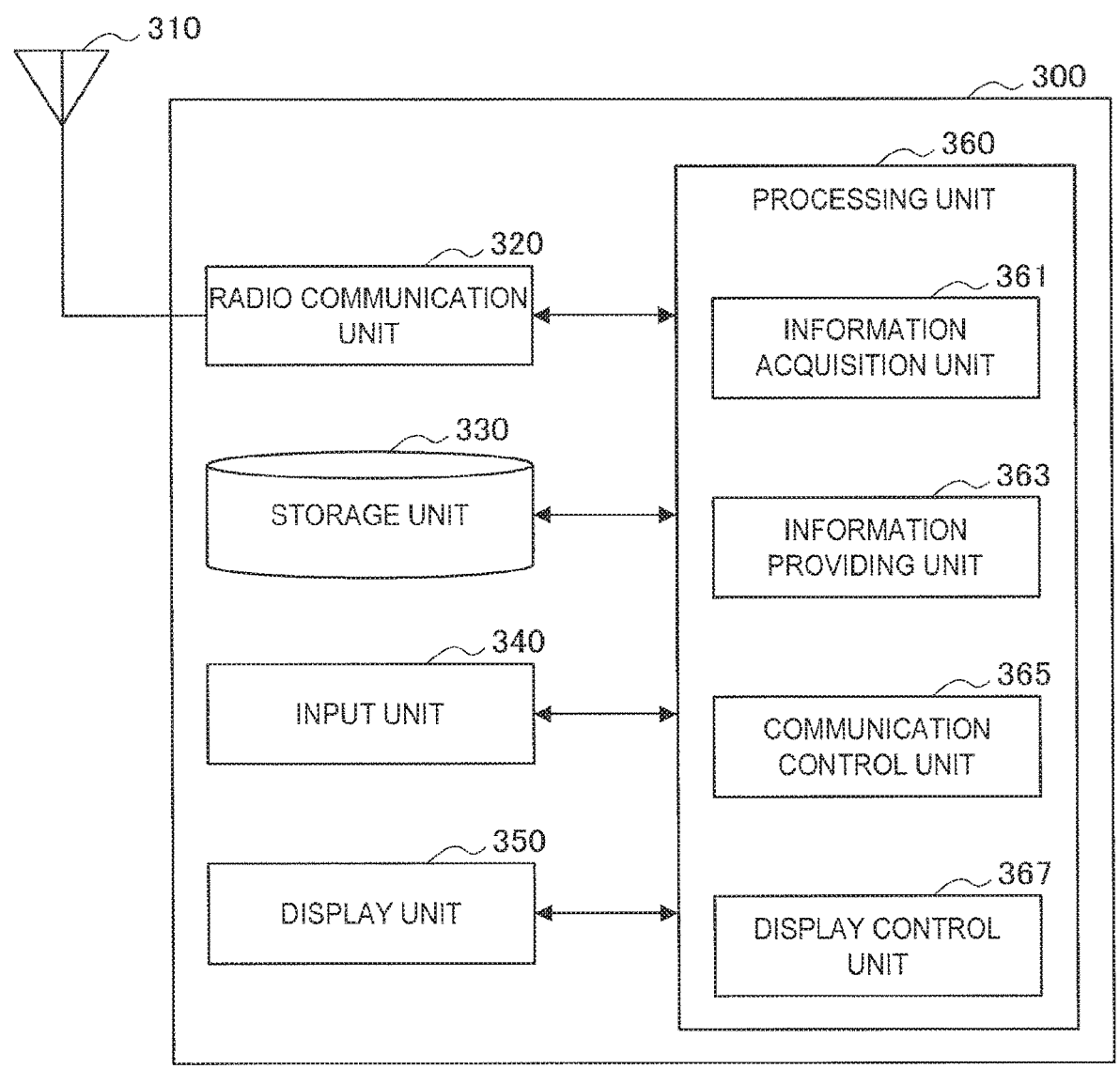
FIG. 9 is a block diagram illustrating an example of a configuration of UE according to an embodiment.

With reference to FIG. 9, an example of a configuration of the UE 300 according to an embodiment of the present disclosure will be described. FIG. 9 is a block diagram illustrating an example of the configuration of the UE 300 according to an embodiment of the present disclosure. With reference to FIG. 9, the UE 300 includes an antenna unit 310, a wireless communication unit 320, a storage unit 330, an input unit 340, a display unit 350, and a processing unit 360.

(Antenna Unit 310)

The antenna unit 310 receives a wireless signal, and outputs the received wireless signal to the wireless communication unit 320. Further, the antenna unit 310 transmits a transmission signal outputted by the wireless communication unit 320.

(Wireless Communication Unit 320)

The wireless communication unit 320 performs wireless communication with the eNB 200 when the UE 300 is located within the cell 20.

(Storage Unit 330)

The storage unit 330 stores a program and data for the operation of the UE 300.

(Input Unit 340)

The input unit 340 receives an input by a user. The input unit 340 then provides the input result for the processing unit 360.

(Display Unit 350)

The display unit 350 displays an output screen (that is, an output image) from the UE 300. For example, the display unit 350 displays the output screen according to control by the processing unit 360 (display control unit 367).

(Processing Unit 360)

The processing unit 360 provides various functions of the UE 300. The processing unit 360 includes an information acquisition unit 361, an information providing unit 363, a communication control unit 365, and a display control unit 365.

(Information Acquisition Unit 361)

Channel-related Information

The information acquisition unit 361 acquires the channel-related information related to a channel state of the UE 300 when being located within the cell 20.

As described above, for example, the channel-related information is a portion or an entirety of the channel state information (CSI), and the information acquisition unit 361 acquires a portion or an entirety (for example, the CQI, PMI and RI) of the CSI.

Position-related Information

Furthermore, the information acquisition unit 361 acquires the position-related information related to a position of the UE 300.

As described above, for example, the position-related information is position information indicating a position of the UE 300. More specifically, the position-related information is position information indicating a position of the UE 300 when the measurement for obtaining the CSI has been performed.

Moreover, for example, a position of the UE 300 is measured by using any of various positioning methods such as the A-GNSS, OTDOA, E-CID, GPS and the like, and the information acquisition unit 361 acquires the position information indicating the measured position.

(Information Providing Unit 363)

The information providing unit 363 provides the eNB 200 with the channel-related information and the position-related information.

Specifically, for example, the eNB 200 requests the UE 300 to report the channel-related information (for example, the CSI). Then, the information providing unit 363 provides the eNB 200 with the combination of the channel-related information and the position-related information via the wireless communication unit 320.

Moreover, as described above, the channel-related information and the position-related information is information used for generating the statistical information related to a channel state according to a position within the cell 20. Further, as described above, the statistical information is information used for the assignment of the wireless resource in the cell 20.

By providing the channel-related information and the position-related information, it becomes possible to perform the assignment of the wireless resource based on the statistical information related to a channel state according to a position in the cell 20. As a result, for example, the amount of the control information transmitted/received within the cell can be further reduced.

(Communication Control Unit 365)

The communication control unit 365 controls wireless communication by the UE 300. For example, the communication control unit 365 acquires resource assignment information (that is, information on the assigned wireless resource) notified by the eNB 200, and allows the wireless communication unit 320 to perform wireless communication with the UE 300 by using the assigned wireless resource.

(Display Control Unit 367)

The display control unit 367 controls display of an output screen by the display unit 350. For example, the display control unit 367 generates the output screen to be displayed by the display unit 350, and allows the display unit 350 to display the output screen.

5. FLOW OF PROCESSING

Next, with reference to FIG. 10 to FIG. 14, an example of the communication control processing according to an embodiment of the present disclosure will be described.

(First Communication Control Processing: Generation of Statistical Information)

Figure 10:
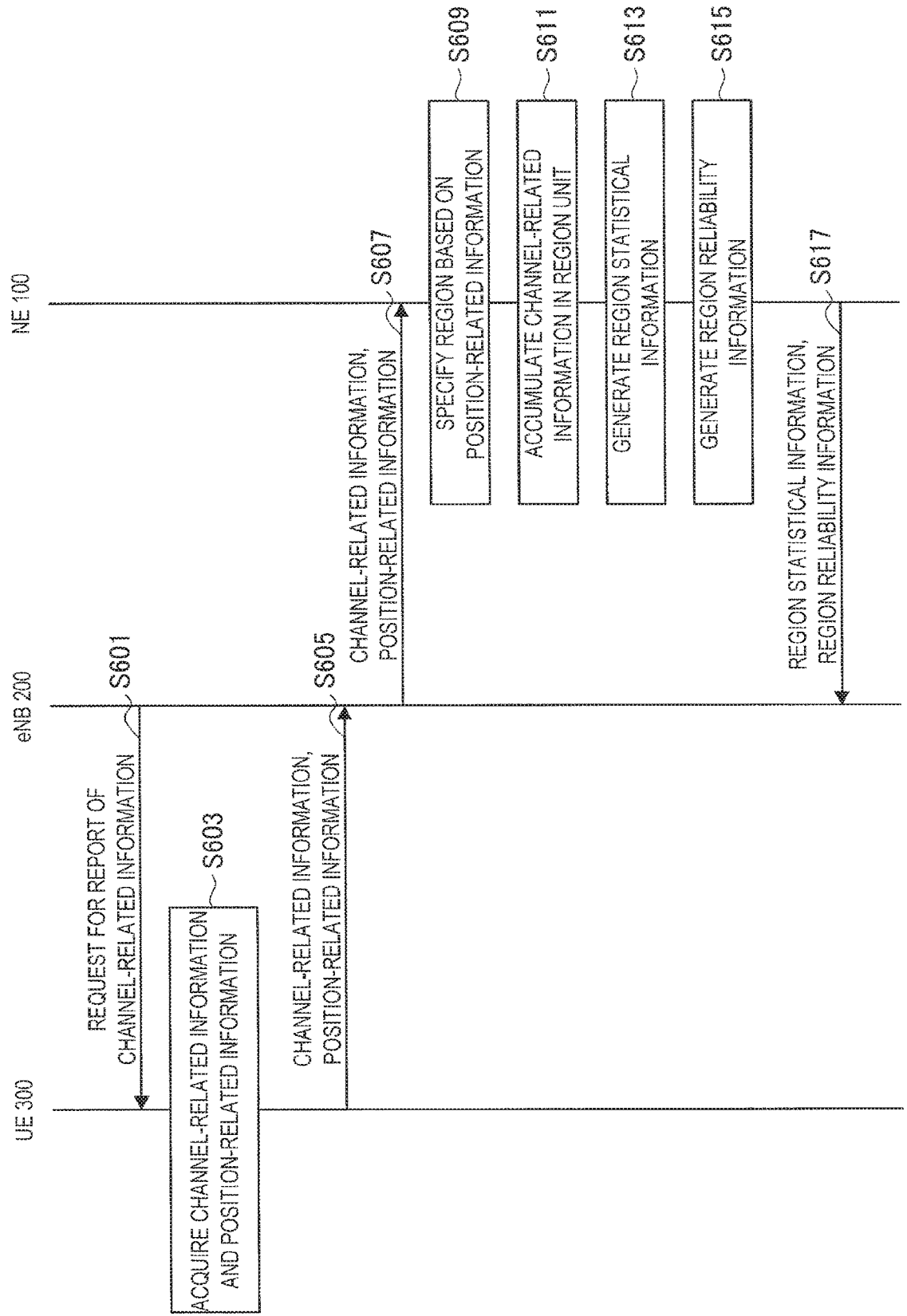
FIG. 10 is a sequence diagram illustrating an example of a schematic flow of first communication control processing (processing related to the generation of the statistical information) according to an embodiment.

FIG. 10 is a sequence diagram illustrating an example of a schematic flow of first communication control processing (processing related to the generation of the statistical information) according to an embodiment of the present disclosure.

First, the eNB 200 (information acquisition unit 251) requests the UE 300 to report the channel-related information (for example, the CSI) (S601). Then, the UE 300 (information acquisition unit 361) acquires the channel-related information and the position-related information (for example, the position information) (S603). Then, the UE 300 (information providing unit 363) provides the eNB 200 with the channel-related information and the position-related information (S605).

After that, the eNB 200 (information providing unit 253) provides the NE 100 with the channel-related information and the position-related information (S607).

Then, the NE 100 (statistical information generation unit 133) specifies the region corresponding to the channel-related information among the plurality of regions included in the cell 20 on the basis of the position-related information (for example, the position information) (S609). Then, the NE 100 (statistical information generation unit 133) accumulates the channel-related information in the region unit (S611). Moreover, the channel-related information continues to be accumulated in the region unit by repeating the above-described processing (S601 to S611).

After that, the statistical information generation unit 133 generates the region statistical information for each region on the basis of the channel-related information accumulated in the region unit (S613). Further, the statistical information generation unit 133 generates the region reliability information related to the reliability of the region statistical information (S615). Then, the statistical information generation unit 133 provides the eNB 200 with the generated region statistical information and region reliability information (S617).

(Second Communication Control Processing: Execution Judgment and Resource Assignment)

Figure 11:
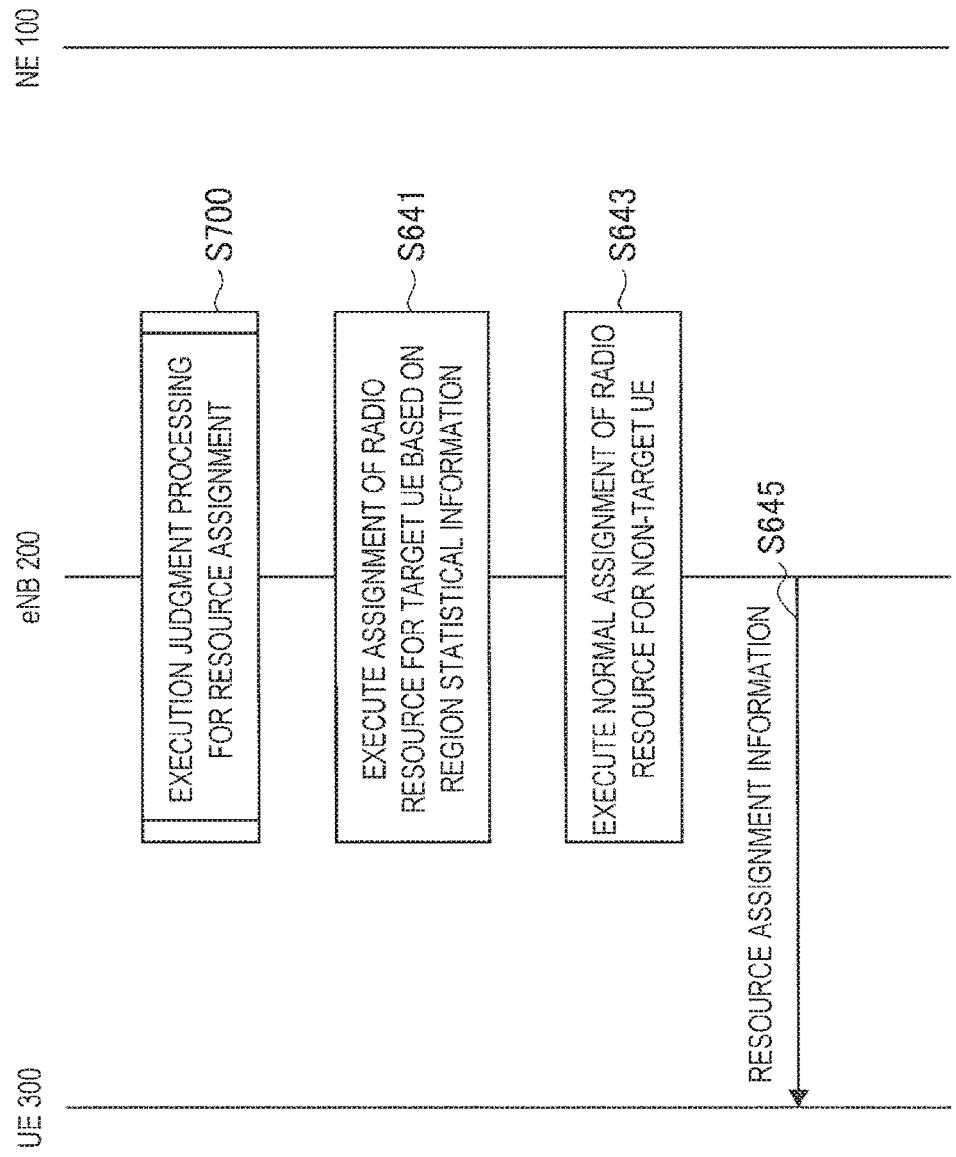
FIG. 11 is a sequence diagram illustrating an example of a schematic flow of second communication control processing (processing related to execution judgment and resource assignment) according to an embodiment.

FIG. 11 is a sequence diagram illustrating an example of a schematic flow of second communication control processing (processing related to execution judgment and resource assignment) according to an embodiment of the present disclosure.

First, the eNB 200 (assignment judgment unit 255) performs the execution judgment processing for the resource assignment (S700). That is, the eNB 200 (assignment judgment unit 255) judges whether the assignment of the wireless resource in the cell 20 based on the statistical information is performed. A specific content of the execution judgment processing will be described later.

Then, the eNB 200 (resource assignment unit 257) performs the assignment of the wireless resource on the basis of the region statistical information, for the UE 300 (target UE) as a target of the assignment of the wireless resource based on the statistical information (S641). Further, the eNB 200 (resource assignment unit 257) performs normal assignment of the wireless resource, for the UE 300 (non-target UE) that is not a target of the assignment of the wireless resource based on the statistical information (S643).

After that, the eNB 200 (resource assignment unit 257) notifies the UE 300 of the resource assignment information (information on the assigned wireless resource) (S645).

Execution Judgment Processing for Resource Assignment

Figure 12:
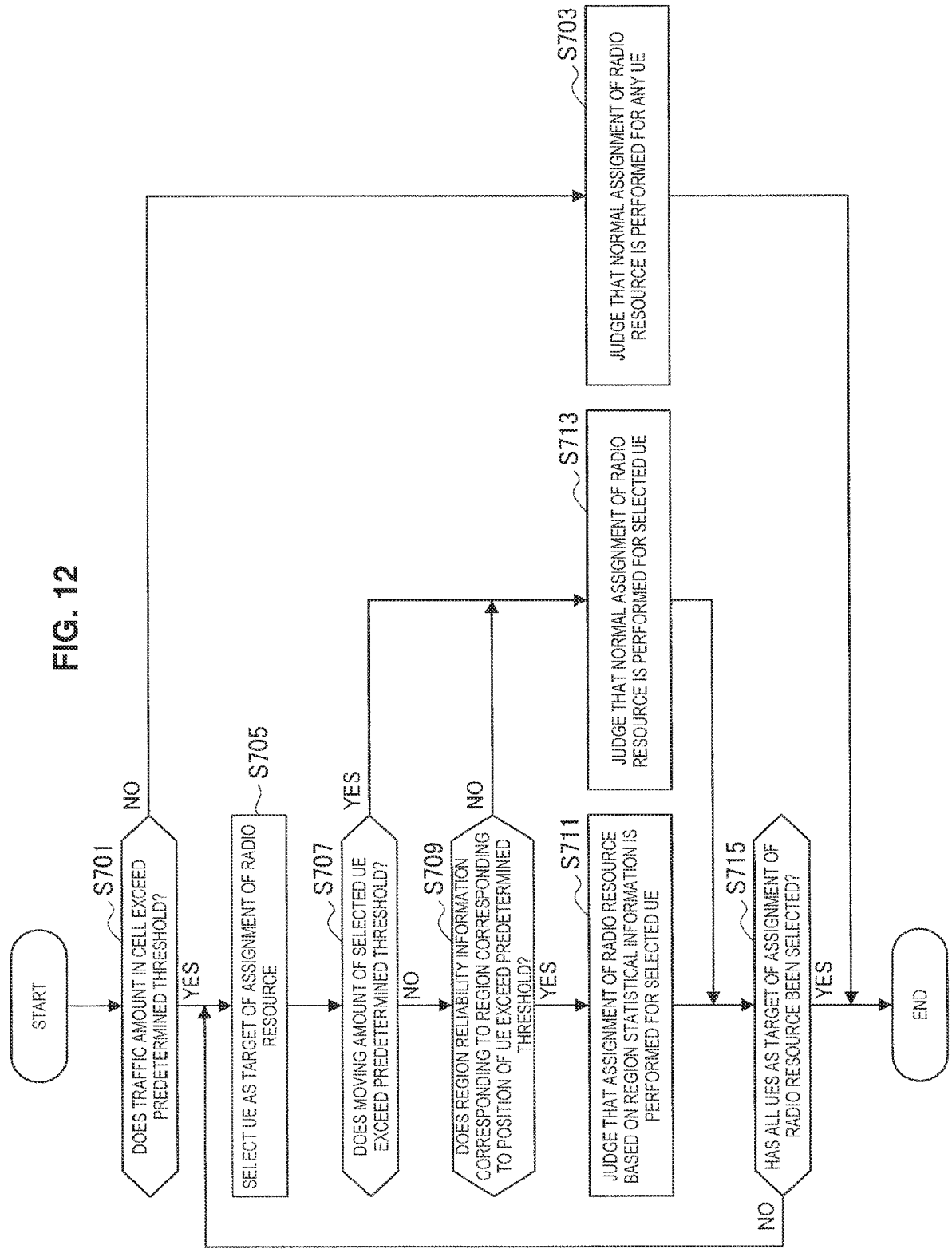
FIG. 12 is a flow chart illustrating an example of a schematic flow of the execution judgment processing for the resource assignment according to an embodiment.

FIG. 12 is a flow chart illustrating an example of a schematic flow of the execution judgment processing for the resource assignment according to an embodiment of the present disclosure. The execution judgment processing corresponds to S700 in the second communication processing shown in FIG. 11, and is executed by the eNB 200.

At Step S701, the assignment judgment unit 255 judges whether the traffic amount within the cell 20 exceeds a predetermined threshold. When the traffic amount exceeds the predetermined threshold, the processing proceeds to Step S703. Otherwise, the processing proceeds to Step S705.

At Step S703, the assignment judgment unit 255 judges that normal assignment of the wireless resource is performed for any UE 300. As a result, any UE 300 becomes the UE 200 (that is, the non-target UE) that is not a target of the assignment of the wireless resource based on the statistical information. The processing then ends.

At Step S705, the assignment judgment unit 255 selects the UE 300 as a target of the assignment of the wireless resource.

At Step S707, the assignment judgment unit 255 judges whether the moving amount of the selected UE 300 exceeds a predetermined threshold. When the moving amount exceeds the predetermined threshold, the processing proceeds to Step S7139. Otherwise, the processing proceeds to Step S709.

At Step S709, the assignment judgment unit 255 judges whether the region reliability information (for example, the reliability) corresponding to the region within the cell 20 corresponding to a position of the selected UE 300 exceeds a predetermined threshold. When the region reliability information exceeds the predetermined threshold, the processing proceeds to Step S711. Otherwise, the processing proceeds to Step S713.

At Step S771, the assignment judgment unit 255 judges that the assignment of the wireless resource based on the region statistical information is performed for the selected UE 300. As a result, the selected UE 300 becomes the UE 300 (that is, the target UE) as a target of the assignment of the wireless resource based on the statistical information.

At Step S713, the assignment judgment unit 255 judges that normal assignment of the wireless resource is performed for the selected UE 300. As a result, the selected UE 300 becomes the UE 300 (that is, the non-target UE) that is not a target of the assignment of the wireless resource based on the statistical information.

At Step S715, it is judged whether all the UE 300 as a target of the assignment of the wireless resource has been selected. When all the UE 300 is selected, the processing ends. Otherwise, the processing returns to Step S705.

(Third Communication Control Processing: Update of Reliability Information)

Feedback for Downlink

Figure 13:
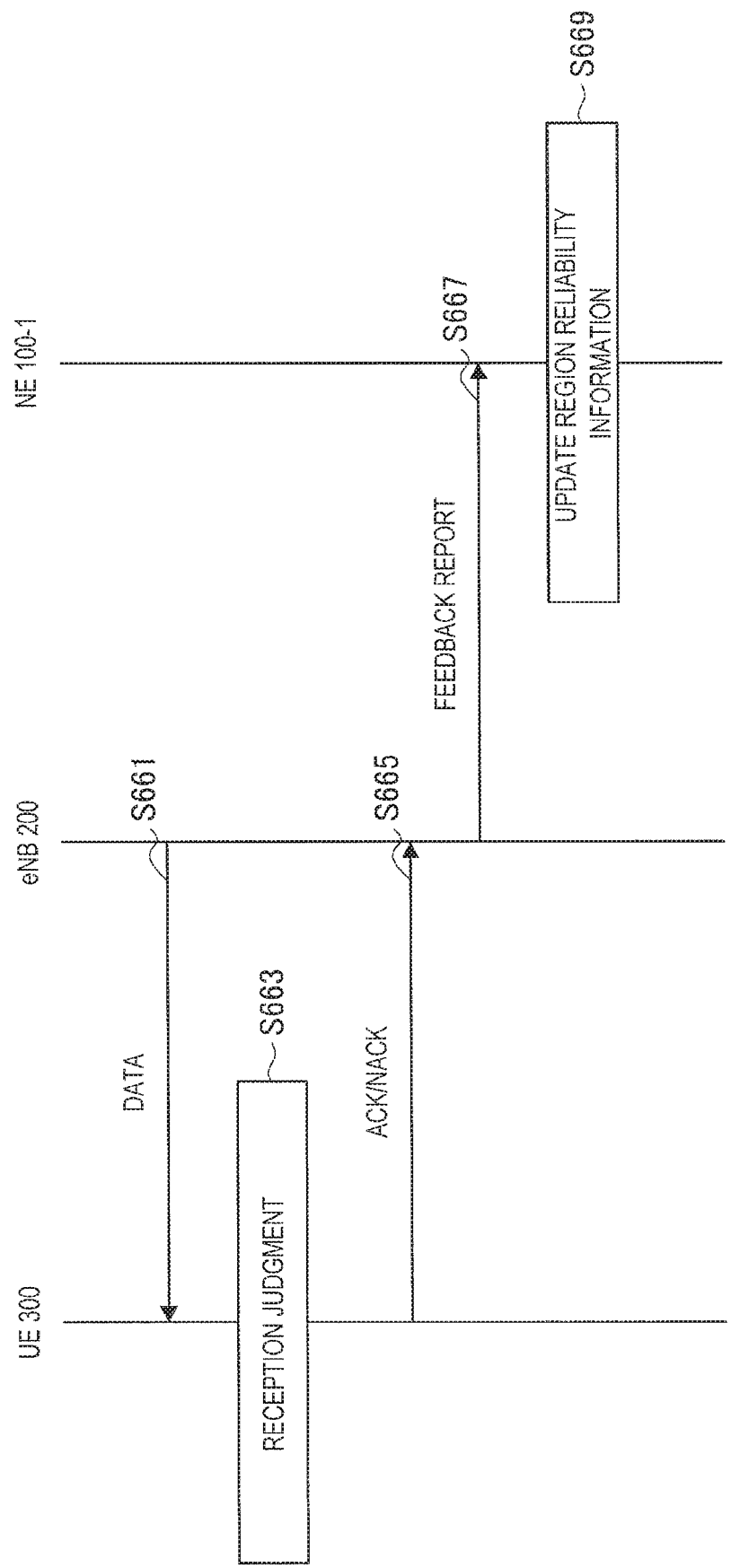
FIG. 13 is a sequence diagram illustrating a first example of a schematic flow of third communication control processing (processing related to update of reliability information) according to an embodiment.

FIG. 13 is a sequence diagram illustrating a first example of a schematic flow of third communication control processing (processing related to update of reliability information) according to an embodiment of the present disclosure. The first example is an example in which the feedback for downlink is performed.

The eNB 200 (communication control unit 259) uses the downlink resource assigned to the UE 300 to transmit data to the UE 300 (S661). Then, the UE 300 (communication control unit 365) performs reception judgment of the data (S663), and transmits ACK or NACK to the eNB 200 according to the result of the reception judgment (S665).

After that, the eNB 200 (information providing unit 253) generates a feedback report including information indicating success or failure of the reception to provide the feedback report for the NE 100 (S667).

Then, the NE 100 (statistical information generation unit 133) updates the region reliability information on the basis of the feedback report from the eNB 200 (S669).

Feedback for Uplink

Figure 14:
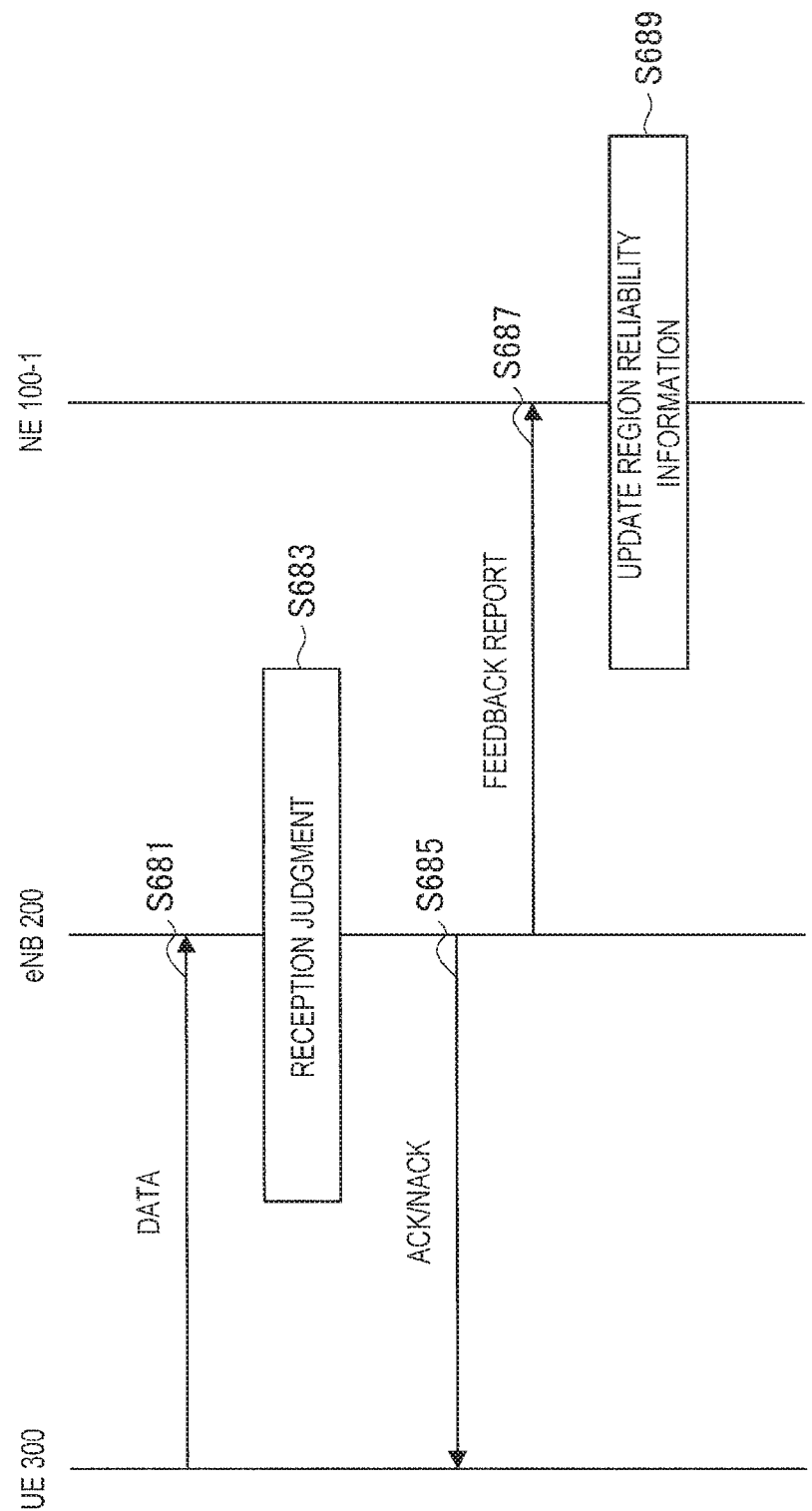
FIG. 14 is a sequence diagram illustrating a second example of the schematic flow of the third communication control processing (processing related to the update of the reliability information) according to an embodiment.

FIG. 14 is a sequence diagram illustrating a second example of the schematic flow of the third communication control processing (processing related to the update of the reliability information) according to an embodiment of the present disclosure. The second example is an example in which the feedback for uplink is performed.

The UE 300 UE 300 (communication control unit 365) uses the downlink resource assigned to the UE 300 to transmit data to the eNB 200 (S681). Then, the eNB 200 (communication control unit 259) performs reception judgment of the data (S683), and transmits ACK or NACK to the UE 300 according to the result of the reception judgment (S685).

After that, the eNB 200 (information providing unit 253) generates a feedback report including information indicating success or failure of the reception to provide the feedback report for the NE 100 (S683).

Then, the NE 100 (statistical information generation unit 133) updates the region reliability information on the basis of the feedback report from the eNB 200 (S689).

6. MODIFICATIONS

Subsequently, with reference to FIG. 15 to FIG. 21, first to fourth modifications according to an embodiment of the present disclosure will be described. The first modification is a modification related to a scenario where the further segmented statistical information is generated and used. Further, the second to fourth modifications are a modification related to a scenario where a macro cell and a small cell are arranged. The small cell may be referred to as a pico cell, a micro cell, or a femto cell.

<<6.1. First Modification>>

In an example of an embodiment of the present disclosure as described above, the statistical information related to a channel state according to a position in the cell is generated. For example, the statistical information includes the region statistical information related to a channel state in each region included in the cell 20.

Meanwhile, in the first modification of an embodiment of the present disclosure, statistical information related to a channel state according to a position, a frequency band and/or a time in the cell 20 is generated. In other words, the region statistical information includes statistical information related to a channel state in each frequency band division, statistical information related to a channel state in each time division, or statistical information related to a channel state in each combination of the frequency band division and the time division.

(NE 100: Information Acquisition Unit 131)

Acquisition of Frequency-Related Information

For example, the information acquisition unit 131 further acquires frequency-related information related to a frequency band associated with the channel state.

For example, the frequency-related information is frequency band information indicating a frequency band where the measurement for acquiring the channel-related information (for example, the CSI) is performed. The frequency band indicated by the frequency band information is any of a component carrier (CC), a frequency band of a bandwidth corresponding to the predetermined number of resource blocks, and the predetermined number of sub-carriers, for example.

Acquisition of Time-Related Information

Further, for example, the information acquisition unit 131 further acquires time-related information related to a time of the measurement of the channel state.

For example, the time-related information is time information indicating a time when the measurement for acquiring the channel-related information (for example, the CSI) is performed. The time indicated by the time information is any of a clock incorporated in the UE 300, a time obtained from the GPS or the like, a time used for the communication system (for example, a system frame number (SFN), a wireless frame index, a sub-frame, a symbol, or the like), for example.

Specific Acquisition Method

For example, the information acquisition unit 131 acquires the frequency-related information and the time-related information along with the channel-related information and the position-related information from the eNB 200.

(NE100: Statistical Information Generation Unit 133)

Statistical Information

Region/Frequency/Time Statistical Information

For example, the statistical information generation unit 133 generates the statistical information further on the basis of the frequency-related information. In this case, the statistical information is statistical information related to a channel state corresponding to a position and a frequency band in the cell 20.

Further, for example, the statistical information generation unit 133 generates the statistical information further on the basis of the time-related information. In this case, the statistical information is statistical information related to a channel state corresponding to a position and a time (and a frequency band) in the cell 20.

Specifically, for example, the statistical information generation unit 133 specifies the region (in other words, the position division) corresponding to the channel-related information among the plurality of regions included in the cell 20, on the basis of the position-related information (for example, the position information) corresponding to the acquired channel-related information. Further, the statistical information generation unit 133 specifies the frequency band division (for example, the frequency band of the bandwidth corresponding to the CC and the predetermined number of resource blocks) corresponding to the channel-related information, on the basis of the frequency-related information (for example, the frequency band information). Further, the statistical information generation unit 133 specifies the time division (for example, a symbol, a sub-frame, a wireless frame, a time frame (between 12:00 and 13:00, between 17:00 and 18:00, or the like), daytime/nighttime, a season, or the like) corresponding to the channel-related information, on the basis of the time-related information (for example, the time information). Then, the statistical information generation unit 133 accumulates the channel-related information in the unit of the combination (hereinafter referred to as a "statistical division") of the region (position division), the frequency band division and the time division. After that, the statistical information generation unit 133 generates division statistical information for each statistical division (that is, the combination of the region, the frequency band division and the time division) on the basis of the channel-related information accumulated in the statistical division unit. For example, the statistical information generation unit 133 generates the division statistical information related to a channel state in a first statistical division (that is, a first combination of the region, the frequency band division and the time division).

As described above, for example, the division statistical information for each statistical division as the combination of the region, the frequency band division and the time division is generated. In other words, in the first modification, the above-described region statistical information further includes the further segmented statistical information for each combination of the frequency band division and the time division. Further, in the first modification, the channel-related information map as shown in FIG. 7 can be generated for each combination of the frequency band division and the time division.

Moreover, the example in which the statistical division is the combination of three divisions of the region, the frequency band and the time division has been described, but the first modification is not limited thereto. For example, the statistical division may be the combination of two divisions of the region and the frequency band division. Further, the statistical division may be the combination of the region, the frequency band division and/or the time division, and another division (as an example, a weather division).

Reliability Information

Division Reliability Information

In the first modification, for example, the reliability information includes division reliability information related to reliability of each division statistical information included in the statistical information. In other words, the above-described region reliability information includes the further segmented division reliability information for each combination of the frequency band division and the time division.

Update of Reliability Information

Furthermore, in the first modification, for example, each division reliability information is updated on the basis of the feedback information corresponding to each statistical division (that is, the combination of the region, the frequency band division, and the time division).

(eNB 200: Information Acquisition Unit 251, Information Providing Unit 253)

Frequency-Related Information and Time-Related Information

In the first modification, for example, the information acquisition unit 251 acquires the frequency-related information and the time-related information along with the channel-related information and the position-related information.

Furthermore, the information providing unit 253 provides the NE 100 with the frequency-related information and the time-related information along with the channel-related information and the position-related information.

Statistical Information and Reliability Information

In the first modification, for example, the information acquisition unit 251 acquires the statistical information including each division statistical information, and the reliability information including each division reliability information.

Feedback Information

In the first modification, for example, the feedback information (feedback report) includes, in addition to the information on the region, for example, the information on the statistical division (region, frequency division, and time division) corresponding to the division statistical information used for the assignment of the wireless resource for wireless communication.

(eNB 200: Assignment Judgment Unit 255)

Judgment Based on Reliability Information

In the first modification, for example, the assignment judgment unit 255 judges whether the assignment based on the statistical information is performed on the basis of the division reliability information related to the reliability of the division statistical information.

(eNB 200: Resource Assignment Unit 257)

In the first modification, for example, the resource assignment unit 257 specifies the region within the cell 20 corresponding to a position of the UE 300. Further, the resource assignment unit 257 further specifies the frequency band division corresponding to the frequency band used for wireless communication of the UE 300, and the time division corresponding to a time of the wireless communication. Then, the resource assignment unit 257 performs the assignment of the wireless resource in the cell 20 on the basis of the division statistical information corresponding to the specified statistical division (region, frequency band division and time division).

(UE 300: Information Acquisition Unit 361, Information Providing Unit 363)

Frequency-Related Information, Time-Related Information

In the first modification, for example, the information acquisition unit 361 acquires the frequency-related information and the time-related information along with the channel-related informatin and the position-related information.

Furthermore, the information providing unit 363 provides the eNB 200 with the frequency-related information and the time-related information along with the channel-related information and the position-related information.

(Flow of Processing: First Communication Control Processing: Generation of Statistical Information)

Figure 15:
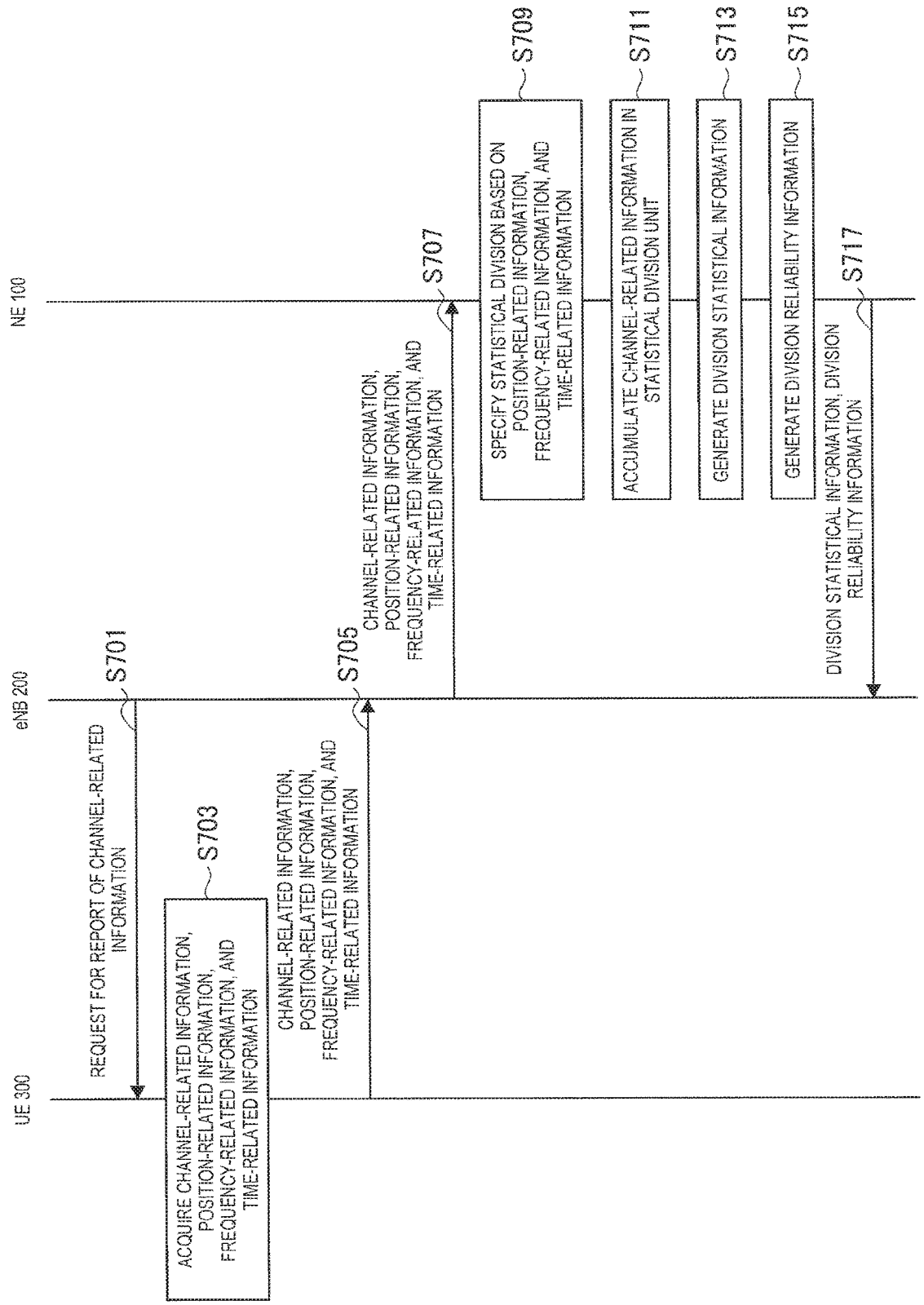
FIG. 15 is a sequence diagram illustrating an example of a schematic flow of first communication control processing (processing related to the generation of the statistical information) according to a first modification of an embodiment.

FIG. 15 is a sequence diagram illustrating an example of a schematic flow of the first communication control processing (processing related to the generation of the statistical information) according to the first modification of an embodiment according to the present disclosure.

First, the eNB 200 (information acquisition unit 251) requests the UE 300 to report the channel-related information (for example, the CSI) (S701). Then, the UE 300 (information acquisition unit 361) acquires the channel-related information, the position-related information (for example, the position information), the frequency-related information (for example, the frequency band information), and the time-related information (for example, the time information) (S703). Then, the UE 300 (information providing unit 363) provides the eNB 200 with the channel-related information, the position-related information, the frequency-related information, and the time-related information (S705).

After that, the eNB 200 (information providing unit 253) provides the NE 100 with the channel-related information, the position-related information, the frequency-related information, and the time-related information (S707).

Then, the NE 100 (statistical information generation unit 133) specifies the statistical division (the combination of the region, the frequency band division and the time division) corresponding to the channel-related information on the basis of the channel-related information, the position-related information, the frequency-related information, and the time-related information (S709). Then, the NE 100 (statistical information generation unit 133) accumulates the channel-related information in the statistical division unit (S711). Moreover, the channel-related information continues to be accumulated by repeating the above-described processing (S701 to S711).

After that, the statistical information generation unit 133 generates the division statistical information for each statistical division on the basis of the channel-related information accumulated in the statistical division unit (S713). The statistical information generation unit 133 generates the division reliability information related to the reliability of the division statistical information (S715). The statistical information generation unit 133 then provides the eNB 200 with the generated division statistical information and division reliability information (S717).

(Flow of Processing: Second Communication Control Processing: Execution Judgment and Resource Assignment)

Also in the first modification, similarly to the processing shown in FIG. 11 and FIG. 12, the second communication control processing (processing related to the execution judgment and the resource assignment) is performed. Moreover, in the first modification, the region statistical information includes the further segmented division statistical information for each combination of the frequency band division and the time division. Therefore, it should be noted that, in FIG. 11 and FIG. 12, the "region", "region statistical information", "region reliability information", and the like may be replaced with the "statistical division", "division statistical information", "division reliability information", and the like.

(Third Communication Control Processing: Update of Reliability Information)

Also in the first modification, similarly to the processing shown in FIG. 13 and FIG. 14, the third communication control processing (processing related to the update of the reliability information) is performed. Moreover, in the first modification, the region statistical information includes the further segmented division statistical information for each combination of the frequency band division and the time division. Therefore, it should be noted that, in FIG. 13 and FIG. 14, the "region reliability information" may be replaced with the "division reliability information".

The first modification of an embodiment according to the present disclosure has been described above.

According to the first modification, for example, the statistical information is generated further on the basis of the frequency-related information. In this case, the statistical information is statistical information related to a channel state corresponding to a position and a frequency band in the cell 20.

Since the frequency band determines the propagation path and the like of wireless waves, the channel state may significantly vary depending on the frequency band. Therefore, the generation of the statistical information related to the channel state corresponding to the frequency band allows the statistical information having higher reliability to be generated. Accordingly, it becomes possible to more properly perform the assignment of the wireless resource, or to more frequently perform the assignment of the wireless resource on the basis of the statistical information.

Furthermore, according to the first modification, for example, the statistical information is generated further on the basis of the time-related information. In this case, the statistical information is statistical information related to a channel state corresponding to a position and a time in the cell 20.

The channel state may vary depending on the time. Therefore, the generation of the statistical information related to the channel state corresponding to the time allows the statistical information having higher reliability to be generated. Accordingly, it becomes possible to more properly perform the assignment of the wireless resource, or to more frequently perform the assignment of the wireless resource on the basis of the statistical information.

<<6.2. Second Modification>>

As an example of an embodiment according to the present disclosure, the example in which a single cell is arranged has been described. Meanwhile, in a second modification of an embodiment according to the present disclosure, a macro cell, and a small cell overlapped with a portion or an entirety of the macro cell are arranged.

(Arrangement of Cell)

Figure 16:
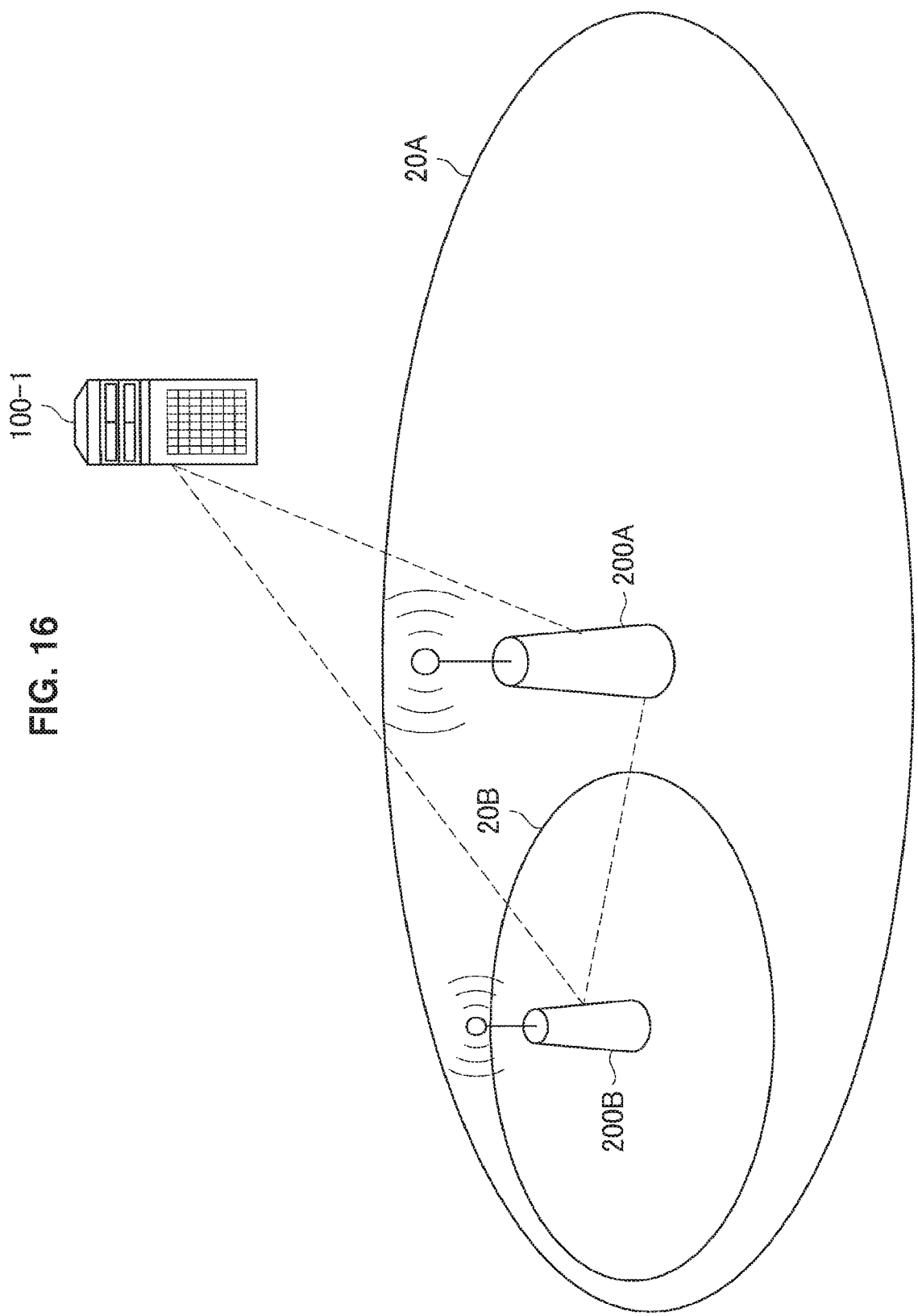
FIG. 16 is an explanatory diagram for explaining an example of arrangement of the cell according to a second modification of an embodiment.

FIG. 16 is an explanatory diagram for explaining an example of arrangement of the cell according to the second modification of an embodiment according to the present disclosure. With reference to FIG. 16, a macro cell 20A, and an eNB 200A of the macro cell 20A are shown. Further, a small cell 20B overlapped with the macro cell 20A, and an eNB 200B of the small cell 20B are shown. In the second modification, the macro cell 20A and the small cell 20B are arranged in this manner.

(NE 100)

For example, the NE 100 operates similarly to the above-described example of an embodiment of the present disclosure for each of the macro cell 20A and the small cell 20B.

Information Acquisition Unit 131

For example, as described above, the information acquisition unit 131 acquires the channel-related information related to a channel state of the UE 300 located within the cell 20. Especially in the second modification, the channel-related information includes first channel-related information (hereinafter referred to as "macro cell channel-related information") related to a channel state of the UE 300 located within the macro cell 20A, and second channel-related information (hereinafter referred to as "small cell channel-related information") related to a channel state of the UE 300 located within the small cell 20B.

For example, as described above, the information acquisition unit 131 acquires the position-related information related to a position of the UE 300. Especially in the second modification, the position-related information includes first position-related information (hereinafter referred to as "macro cell position-related information") related to a position of the UE 300 located within the macro cell 20A, and second position-related information (hereinafter referred to as "small cell position-related information") related to a position of the UE 300 located within the small cell 20B.

Moreover, for example, the macro cell channel-related information and the macro cell position-related information is provided for the NE 100 by the eNB 200A of the macro cell 20A. On the other hand, the small cell channel-related information and the small cell position-related information is provided for the NE 100 by the eNB 200B of the small cell 20B.

Statistical Information Generation Unit 133

Further, as described above, the statistical information generation unit 133 generates the statistical information related to a channel state according to a position in the cell 20 on the basis of the channel-related information related to the channel state of the UE 300 located within the cell 20, and the position-related information related to the position of the UE 300. Especially in the second modification, for example, the statistical information includes first statistical information (hereinafter referred to as "macro cell statistical information") related to a channel state according to a position in the macro cell 20A, and second statistical information (hereinafter referred to as "small cell statistical information") related to a channel state according to a position in the small cell 20B.

Moreover, for example, the statistical information generation unit 133 generates the statistical information for each cell 20. That is, the statistical information generation unit 133 generates the macro cell statistical information on the basis of the macro cell channel-related information and the macro cell position-related information. Further, the statistical information generation unit 133 generates the small cell statistical information on the basis of the small cell channel-related information and the small cell position-related information.

(eNB 200A, eNB 200B)

Also in the second modification, for example, the eNB 200A of the macro cell 20A, and the eNB 200B of the small cell 20B operate, similarly to the eNB 200 of an embodiment according to the present disclosure as described above.

(UE 300)

Also in the second modification, for example, the UE 300 operates, similarly to the example of an embodiment according to the present disclosure as described above.

(Overall Assignment of Wireless Resource)

As described above, for example, the assignment of the wireless resource is separately performed for each of the macro cell 20A and the small cell 20B. However, the second modification of an embodiment according to the present disclosure is not limited thereto. For example, the assignment of the wireless resource may be performed in the communication system as a whole including the macro cell 20A and the small cell 20B.

Example of Assignment of Wireless Resource

For example, it may be judged for the UE 300 by using the macro cell statistical information and the small cell statistical information, which of the macro cell 20A and the small cell 20B the assignment of the wireless resource is performed in. Then, according to the judgment result, the wireless resource in one of the macro cell 20A and the small cell 20B may be assigned to the UE 300.

As an example, when a channel state of the UE 300 is more favorable in the macro cell than in the small cell, it is judged that the assignment of the wireless resource in the macro cell is performed for the UE 300. On the other hand, when a channel state of the UE 300 is more favorable in the small cell than in the macro cell, it is judged that the assignment of the wireless resource in the small cell is performed for the UE 300. This point will be specifically described with reference to FIG. 17 and FIG. 18.

Figure 17:
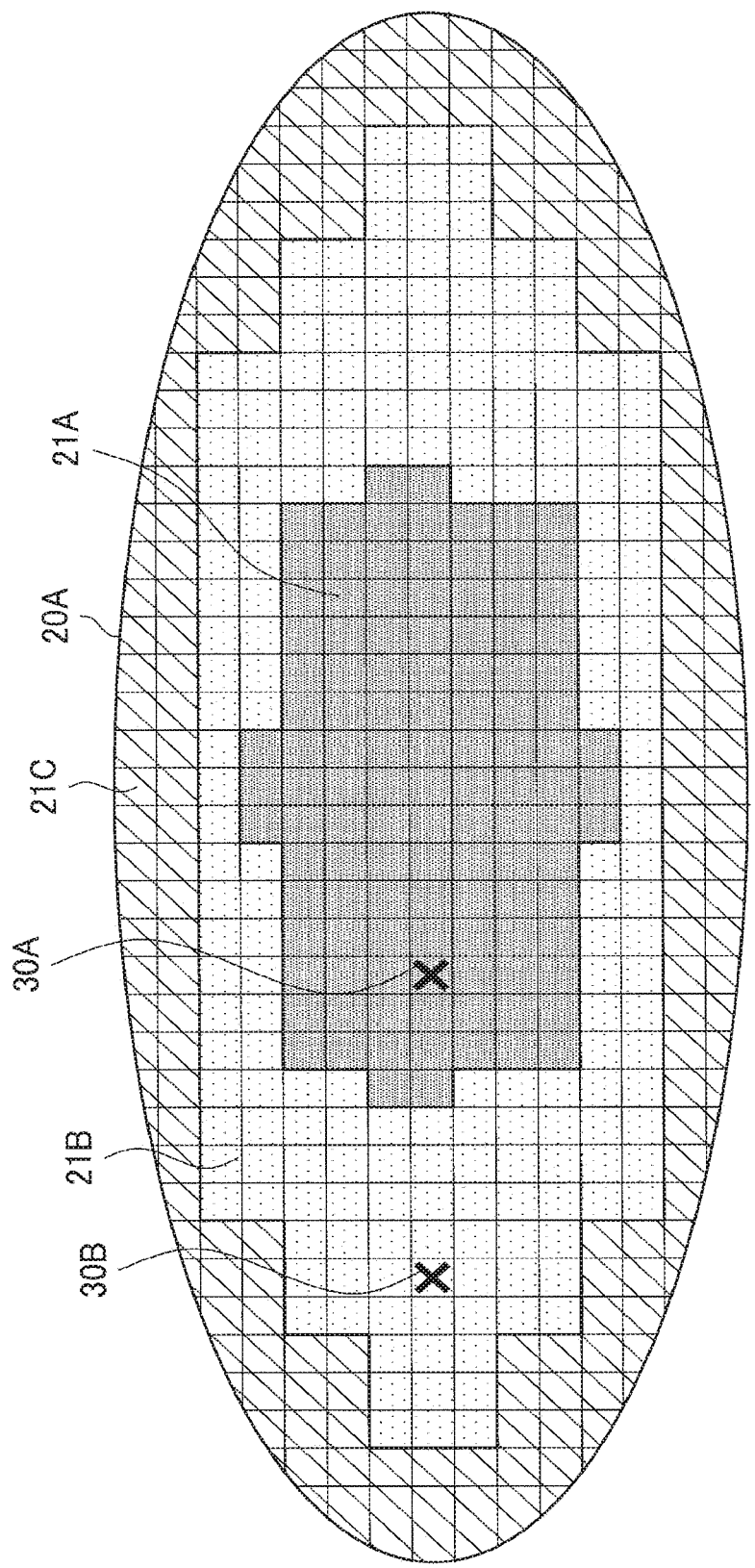
FIG. 17 is an explanatory diagram for explaining an example of the region statistical information included in macro cell statistical information.

FIG. 17 is an explanatory diagram for explaining an example of the region statistical information included in the macro cell statistical information. The macro cell 20A, and a plurality of regions 21 included in the macro cell 20A are shown. In FIG. 17, in order to indicate the region statistical information, the pattern according to the region statistical information included in the macro cell statistical information is added to each region 21. For example, the more favorable region statistical information (for example, in a case of the CQI, $10<=x<=15$) is generated for a region 21A. Further, the worse region statistical information (for example, in a case of the CQI, $0<=x<5$) is generated for a region 21C. Further, the other region statistical information (for example, in a case of the CQI, $5<=x<10$) is generated for a region 21B. For example, when the UE 300 is located at a position 30A, since the position 30A corresponds to the region 21A according to the macro cell statistical information, a channel state of the UE 300 is good in the macro cell 20A. Further, when the UE 300 is located at a position 30B, since the position 30B corresponds to the region 21B according to the macro cell statistical information, a channel state of the UE 300 is neither good nor bad in the macro cell 20A.

Figure 18:
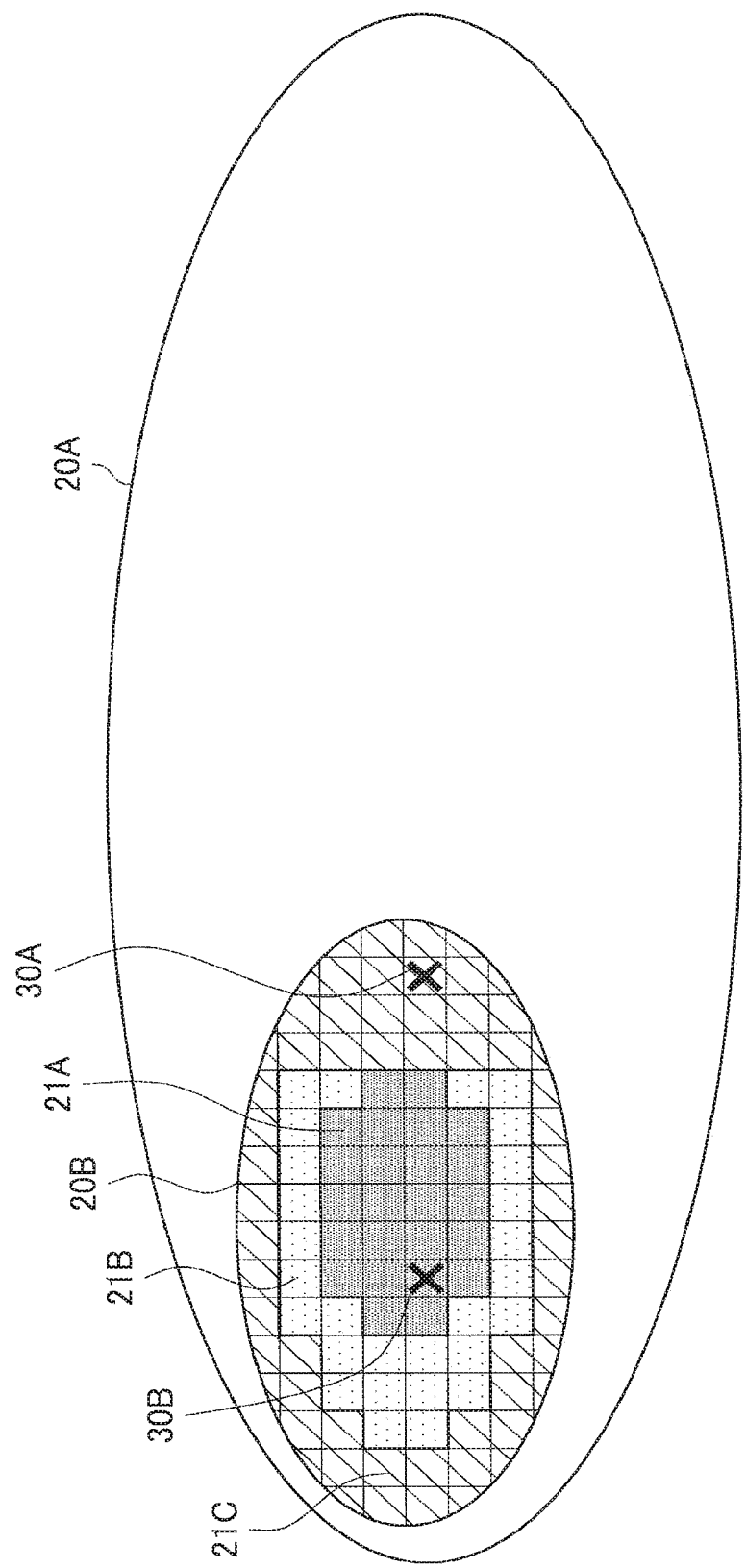
FIG. 18 is an explanatory diagram for explaining an example of the region statistical information included in small cell statistical information.

FIG. 18 is an explanatory diagram for explaining an example of the region statistical information included in the small cell statistical information. The small cell 20B, and the plurality of regions 21 included in the small cell 20B are shown. In FIG. 18, similarly to FIG. 17, the pattern according to the region statistical information included in the small cell statistical information is added to each region 21. For example, when the UE 300 is located at the position 30A, since the position 30A corresponds to the region 21C according to the small cell statistical information, a channel state of the UE 300 is bad in the macro cell 20A. For example, when the UE 300 is located at the position 30B, since the position 30B corresponds to the region 21A according to the small cell statistical information, a channel state of the UE 300 is good in the macro cell 20A.

As described above, for example, when the UE 300 is located at the position 30A, the channel state in the macro cell 20A is good, but the channel state in the small cell 20B is bad. Therefore, it is judged that, when the UE 300 is located at the position 30A, the assignment of the wireless resource in the macro cell 20A is performed for the UE 300. Further, for example, when the UE 300 is located at the position 30B, the channel state in the macro cell 20A is neither good nor bad, but the channel state in the small cell 20B is good. Therefore, it is judged that, when the UE 300 is located at the position 30B, the assignment of the wireless resource in the macro cell 20B is performed for the UE 300.

In this manner, it may be judged for the UE 300 by using the macro cell statistical information and the small cell statistical information, which of the macro cell 20A and the small cell 20B the assignment of the wireless resource is performed in. This makes it possible to perform wireless communication in a more favorable channel state. As a result, the system capacity, throughput and the like can be increased in the communication system 1 as a whole. This point will be specifically described below with reference to FIG. 15.

Figure 19:
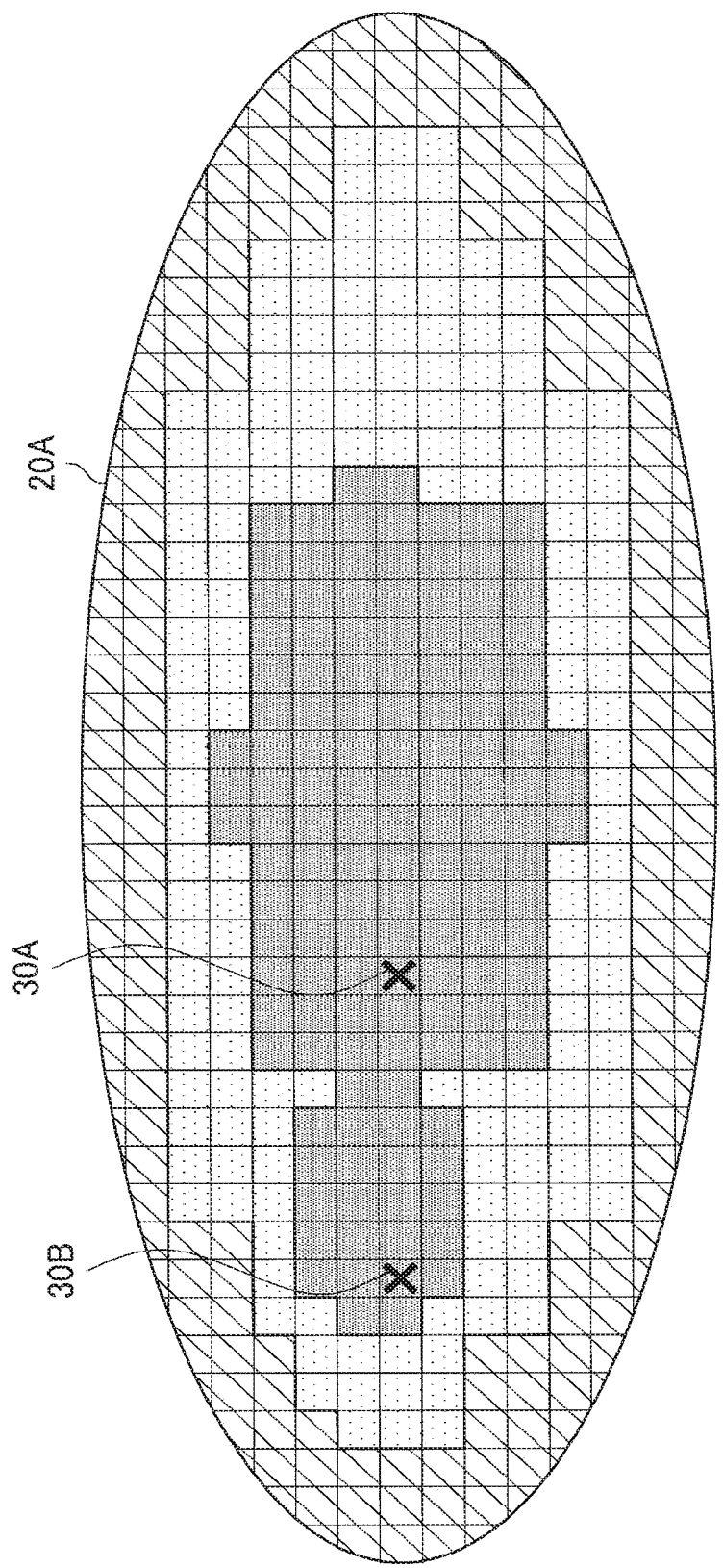
FIG. 19 is an explanatory diagram for explaining an example of a channel state of the UE by selective wireless resource assignment in a macro cell and a small cell.

FIG. 19 is an explanatory diagram for explaining an example of a channel state of the UE by the selective wireless resource assignment in the macro cell and the small cell. With reference to FIG. 19, the macro cell 20A and the plurality of regions 21 included in the macro cell 20A are shown. In FIG. 19, the channel state obtained by the UE 300 as a result of the selective wireless resource assignment in the macro cell 20A and the small cell 20B as described above is shown as a pattern. Each pattern is similar to that of FIG. 17 and FIG. 18. As described above, the UE 300 obtains the more favorable channel state out of the channel state in the macro cell 20A and the channel state in the small cell 20B. Therefore, as shown in FIG. 19, the UE 300 can obtain a good channel state or a satisfactory channel state in the wide range of the cell 20. For example, the UE 300 can obtain a good channel state when being located both at the position 30A and at the position 30B.

Initiative of Judgment

The judgment of which of the macro cell 20A and the small cell 20B the assignment of the wireless resource is performed in for the UE 300, may be performed by an apparatus assigning the wireless resource. For example, in the second modification, the apparatus is each of the eNB 200A and the eNB 200B. In this case, the NE 100 may provide each of the eNB 200 of the macro cell 20A and the eNB 200B of the small cell 20B with both the macro cell statistical information and the small cell statistical information.

Flow of Processing

Figure 20:
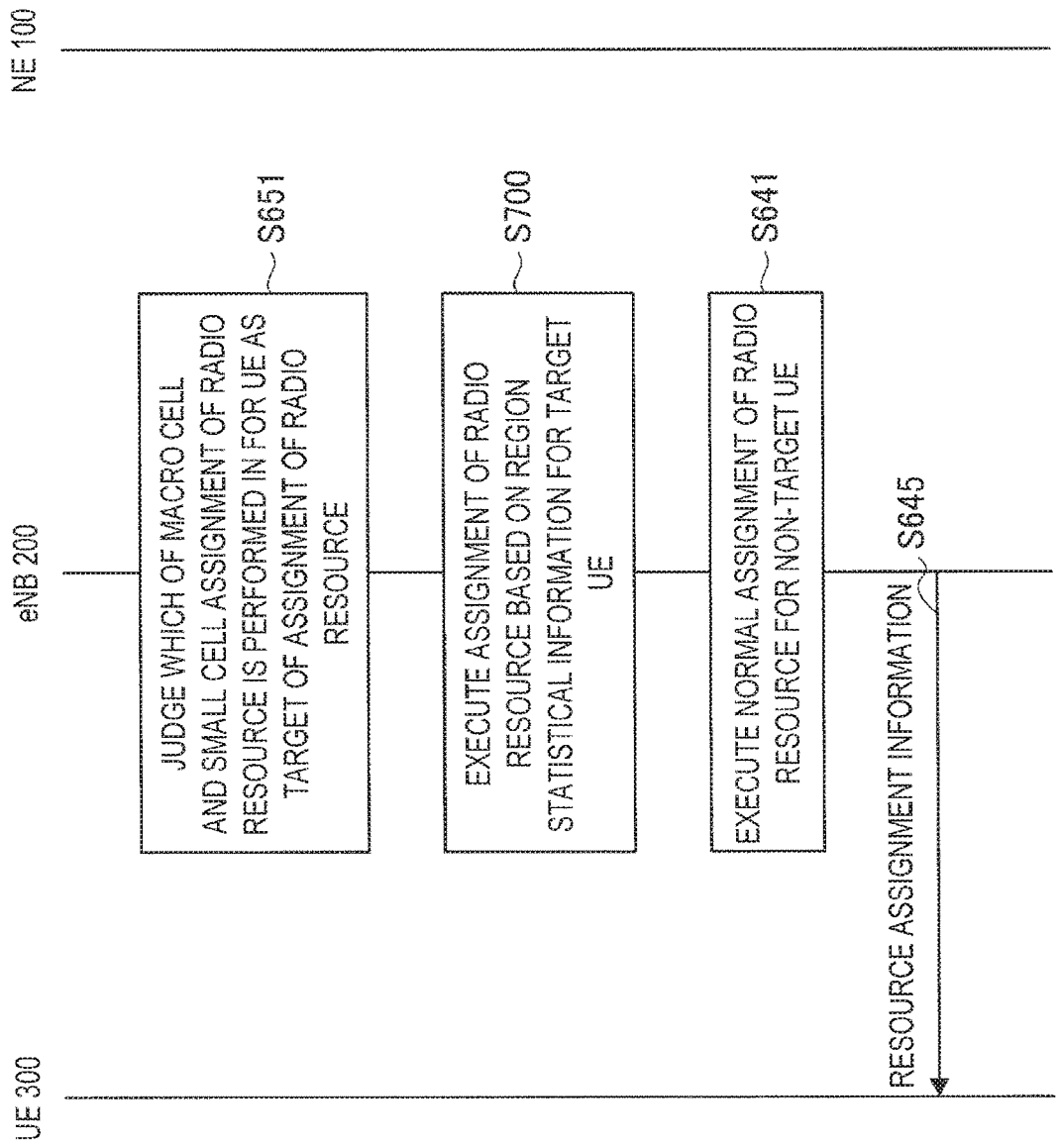
FIG. 20 is a sequence diagram illustrating an example of a schematic flow of second communication control processing (processing related to the execution judgment and the resource assignment) according to the second modification of an embodiment.

FIG. 20 is a sequence diagram illustrating an example of a schematic flow of the second communication control processing (processing related to the execution judgment and the resource assignment) according to the second modification of an embodiment of the present disclosure. The eNB 200 shown in FIG. 20 is the eNB 200 of the macro cell 20A or the eNB 200B of the small cell 20B.

First, the eNB 200 (assignment judgment unit 255) judges which of the macro cell 200A and the small cell 20B the assignment of the wireless resource is performed in by using the macro cell statistical information and the small cell statistical information for the UE 300 as a target of the assignment of the wireless resource (S651).

Moreover, if the eNB 200 is the eNB 200A of the macro cell 20A, the subsequent processing (S700, S641, S643 and S645) is performed for the UE 300 as a target of the assignment of the wireless resource in the macro cell 20A. On the other hand, if the eNB 200 is the eNB 200B of the small cell 20B, the subsequent processing (S700, S641, S643 and S645) is performed for the UE 300 as a target of the assignment of the wireless resource in the small cell 20B.

The subsequent processing (S700, S641, S643 and S645) has been described with reference to FIG. 12, as an example of an embodiment according to the present disclosure.

(Frequency Band Used in Each Cell)

Scenario 2a/2b

For example, separate frequency bands are used in the macro cell 20A and the small cell 20B (a scenario 2a/2b of the small cell). In this case, the eNB 200A and the eNB 200B can perform the assignment of the wireless resource, independently.

Scenario 1

For example, the same frequency band is used in common in the macro cell 20A and the small cell 20B (a scenario 1 of the small cell). In this case, when the eNB 200A and the eNB 200B perform the assignment of the wireless resource independently, the interference may occur. Therefore, for example, the assignment of the wireless resource in the macro cell 20A and the assignment of the wireless resource in the small cell 20B are performed in a coordinated manner.

As an example, the eNB 200A of the macro cell 20A controls the eNB 200B of the small cell 20B, and thereby the assignment of the wireless resource in the macro cell 20A and the assignment of the wireless resource in the small cell 20B are performed in a coordinated manner.

As an example of coordination, the assignment of the wireless resource in the macro cell 20A and the small cell 20B may be performed so as to prevent the eNB 200A of the macro cell 20A and the eNB 200B of the small cell 20B from performing wireless communication at the same frequency and the same time. Further, an assignment ratio in a time direction of an almost blank subframe (ABS) of enhanced inter-cell interference coordination (eICIC) adopted in Release 10 of the 3GPP may be adjusted by using the statistical information.

Moreover, the judgment of which of the macro cell 20A and the small cell 20B the assignment of the wireless resource is performed in for the UE 300 as described above may be applied to any of the scenario 1, the scenario 2a/2b and a scenario 3 to be described later.

(Initiative of Assignment of Wireless Resource)

As described above, for example, the assignment of the wireless resource is performed by each of the eNBs 200 for each of the macro cell 20A and the small cell 20B.

However, the second modification of an embodiment according to the present disclosure is not limited thereto. As an example, the assignment of the wireless resource in both the macro cell 20A and the small cell 20B may be performed by the NE 100. Further, the assignment of the wireless resource in both the macro cell 20A and the small cell 20B may be performed by the eNB 200A of the macro cell 20A. In this manner, the assignment of the wireless resource in both the macro cell 20A and the small cell 20B may be performed by one communication node.

This facilitates the coordination between the assignment of the wireless resource in the macro cell 20A and the assignment of the wireless resource in the small cell 20B. Moreover, the assignment of the wireless resource by one communication node as described above may be applied to any of the scenario 1, the scenario 2a/2b and a scenario 3 to be described later.

<<6.3. Third Modification>>

As an example of an embodiment according to the present disclosure, the example in which a single cell is arranged has been described. Further, as the second modification of an embodiment according to the present disclosure, the example in which the macro cell, and the small cell overlapped with a portion or an entirety of the macro cell are arranged has been described. Meanwhile, in a third modification of an embodiment according to the present disclosure, only the small cell is arranged.

(Arrangement of Cell)

Figure 21:
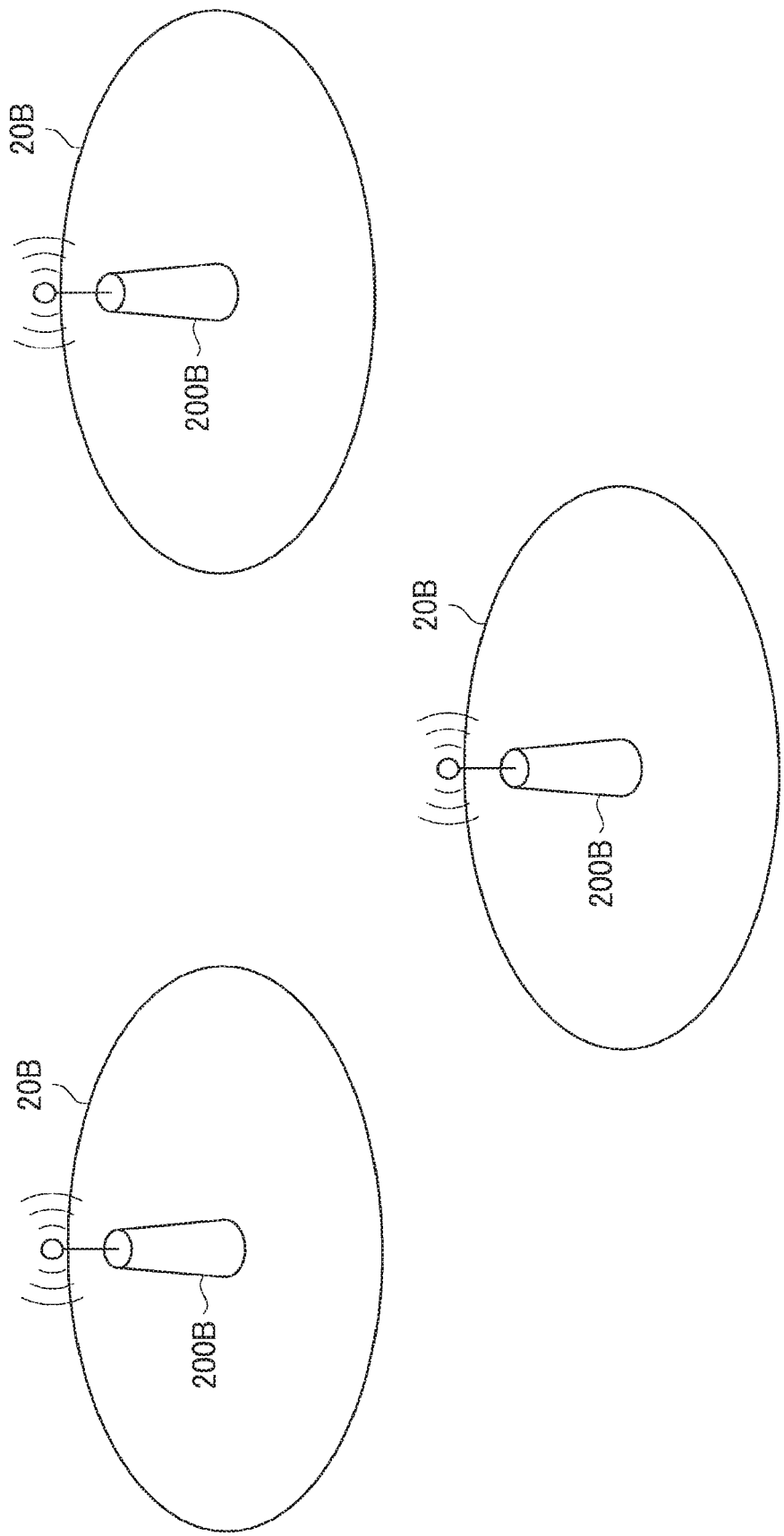
FIG. 21 is an explanatory diagram for explaining an example of arrangement of the cell according to a third modification of an embodiment.

FIG. 21 is an explanatory diagram for explaining an example of arrangement of the cell according to the third modification of an embodiment according to the present disclosure. With reference to FIG. 21, the plurality of small cells 20B, and the eNB 200B of the plurality of small cells 20B are shown. In the third modification, the macro cell is not arranged, but the small cell 20B is arranged in this manner.

(NE 100)

Also in the third modification, for example, the NE 100 operates for each of the plurality of small cells 20B, similarly to the example of an embodiment according to the present disclosure as described above.

(eNB 200B)

Also in the third modification, for example, the eNB 200B of the small cell 20B operates, similarly to the eNB 200 of an embodiment according to the present disclosure as described above.

(UE 300)

Also in the third modification, for example, the UE 300 operates, similarly to the example of an embodiment according to the present disclosure as described above.

(Initiative of Assignment of Wireless Resource)

As described above, for example, the assignment of the wireless resource is performed by each eNB 200B for each of the small cells 20B. This can prevent the effect of delay in backhaul for the assignment of the wireless resource. However, the third modification of an embodiment according to the present disclosure is not limited thereto. As an example, the assignment of the wireless resource in each of the plurality of small cells 20B may be performed by the NE 100.

7. APPLICATION EXAMPLES

The technology of the present disclosure is applicable to various products. For example, the network entity (NE) 100 may be realized as any type of server such as a tower server, a rack server, and a blade server. At least part of components of the NE 100 may be realized in a module (such as an integrated circuit module including a single die, and a card or a blade that is inserted into a slot of a blade server) mounted on a server.

For example, the eNB 200 may be realized as any type of eNB such as a macro eNB, and a small eNB. A small eNB may be an eNB that covers a cell smaller than a macro cell, such as a pico eNB, micro eNB, or home (femto) eNB. The eNB 200 may include a main body (that is also referred to as a base station apparatus) configured to control wireless communication, and one or more remote wireless heads (RRH) disposed in a different place from the main body. Additionally, various types of terminals to be described later may also operate as the eNB 200 by temporarily or semi-permanently executing a base station function. Further, at least part of components of the eNB 200 may be realized in the base station apparatus or a module for the base station apparatus.

For example, the UE 300 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The UE 300 may also be realized as a terminal (that is also referred to as a machine type communication (MTC) terminal) configured to perform machine-to-machine (M2M) communication. Furthermore, at least part of components of the UE 300 may be realized in a module (such as an integrated circuit module including a single die) mounted on each of the terminals.

<7.1 Application Example Regarding Network Entity (NE)>

Figure 22:
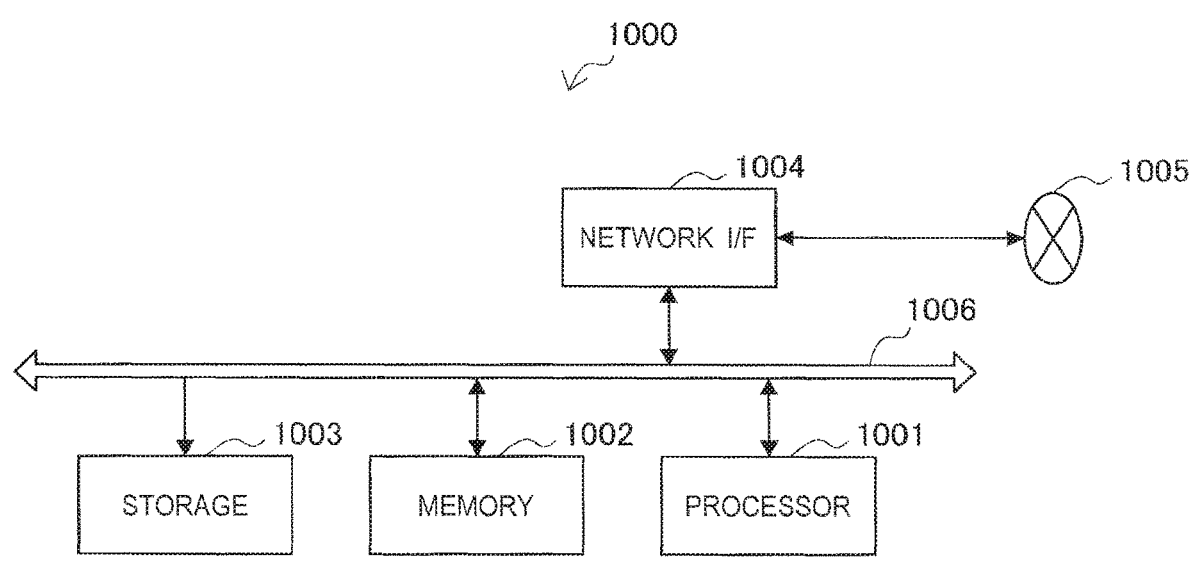
FIG. 22 is a block diagram illustrating an example of a schematic configuration of a server.

FIG. 22 is a block diagram illustrating an example of a schematic configuration of a server 1000 to which the technology of the present disclosure may be applied. The server 1000 includes a processor 1001, a memory 1002, a storage 1003, a network interface 1004, and a bus 1006.

The processor 1001 may be, for example, a central processing unit (CPU) or a digital signal processor (DSP), and controls various kinds of functions of the server 1000. The memory 1002 includes random access memory (RAM) and read only memory (ROM), and stores a program that is executed by the processor 1001 and data. The storage 1003 may include a storage medium such as a semiconductor memory and a hard disk.

The network interface 1004 is a wired communication interface for connecting the server 700 to a wired communication network 1005. The wired communication network 1005 may be a core network such as an evolved packet core (EPC), or a packet data network (PDN) such as the Internet.

The bus 1006 connects the processor 1001, the memory 1002, the storage 1003, and the network interface 1004 to each other. The bus 1006 may include two or more buses (such as a high speed bus and a low speed bus) each of which has different speed.

In the server shown in FIG. 22, the information acquisition unit 131 and the statistical information generation unit 133 described with reference to FIG. 2 may be implemented in the processor 701. As an example, a program for allowing the processor to function as the information acquisition unit 131 and the statistical information generation unit 133 (in other words, a program for allowing the processor to execute the operation of the information acquisition unit 131 and the statistical information generation unit 133) may be installed in the server 700, and the processor 701 may execute the program. As another example, the server 700 may incorporate a module including the processor 701 and the memory 702, and the information acquisition unit 131 and the statistical information generation unit 133 may be implemented in the module. In this case, in the module, the program for allowing the processor to execute the operation of the information acquisition unit 131 and the statistical information generation unit 133 may be stored in the memory 702, and the program may be executed by the processor 701. As described above, the server 700 or the module may be provided as an apparatus including the information acquisition unit 131 and the statistical information generation unit 133, and the program for allowing the processor to execute the operation of the information acquisition unit 131 and the statistical information generation unit 133 may be provided. A readable recording medium recording the program therein may be provided.

<7.2. Application Examples Regarding eNB>>

First Application Example

Figure 23:
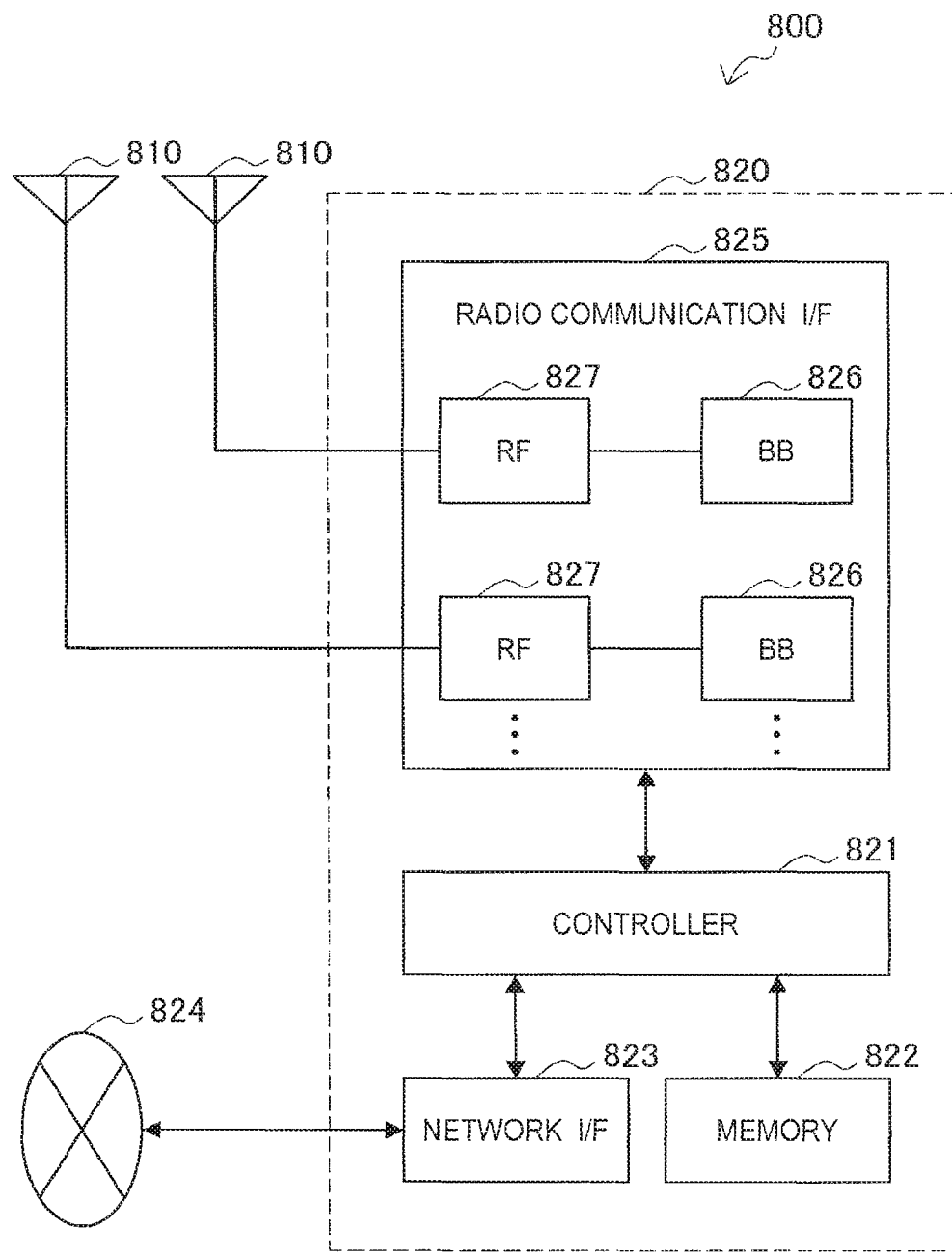
FIG. 23 is a block diagram illustrating a first example of a schematic configuration of an eNB.

FIG. 23 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive wireless signals. The eNB 800 may include the multiple antennas 810, as illustrated in FIG. 23. For example, the multiple antennas 810 may be compatible with multiple frequency bands used by the eNB 800. Although FIG. 23 illustrates the example in which the eNB 800 includes the multiple antennas 810, the eNB 800 may also include a single antenna 810.

The base station apparatus 820 includes a controller 821, a memory 822, a network interface 823, and a wireless communication interface 825.

The controller 821 may be, for example, a CPU or a DSP, and operates various functions of a higher layer of the base station apparatus 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as wireless resource control, wireless bearer control, mobility management, admission control, and scheduling. The control may be performed in corporation with an eNB or a core network node in the vicinity. The memory 822 includes a RAM and a ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides wireless connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), wireless link control (RLC), and a packet data convergence protocol (PDCP)). The BB processor 826 may have a portion or an entirety of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

The wireless communication interface 825 may include the multiple BB processors 826, as illustrated in FIG. 23. For example, the multiple BB processors 826 may be compatible with multiple frequency bands used by the eNB 800. The wireless communication interface 825 may include the multiple RF circuits 827, as illustrated in FIG. 23. For example, the multiple RF circuits 827 may be compatible with multiple antenna elements. Although FIG. 23 illustrates the example in which the wireless communication interface 825 includes multiple BB processors 826 and the multiple RF circuits 827, the wireless communication interface 825 may also include a single BB processor 826 or a single RF circuit 827.

In the eNB 800 shown in FIG. 23, the one or more components (information acquisition unit 251, information providing unit 253, assignment judgment unit 255, resource assignment unit 257, and/or communication control unit 259) included in the processing unit 250 described with reference to FIG. 8 may be implemented in the wireless communication interface 825. Alternatively, at least part of these components may be implemented in the controller 821. As an example, the eNB 800 incorporates part (for example, the BB processor 826) or an entirety of the wireless communication interface 825, and/or a module including the controller 821, and the one or more components may be implemented in the module. In this case, the module may store a program for allowing the processor to function as the one or more components (in other words, a program for allowing the processor to execute the operation of the one or more components), and may execute the program. As another example, a program for allowing the processor to function as the one or more components may be installed in the eNB 800, and the wireless communication interface 825 (for example, the BB processor 826) and/or the controller 821 may execute the program. As described above, as an apparatus including the one or more components, the eNB 800, the base station apparatus 820 or the module may be provided, and the program for allowing the processor to function as the one or more components may be provided. Further, a readable medium recording the program therein may be provided.

Furthermore, in the eNB 800 shown in FIG. 23, the wireless communication unit 220 described with reference to FIG. 8 may be implemented in the wireless communication interface 825 (for example, the RF circuit 827). Further, the antenna unit 210 may be implemented in the antenna 810. Further, the network communication unit 230 may be implemented in the controller 821 and/or the network interface 823.

Second Application Example

Figure 24:
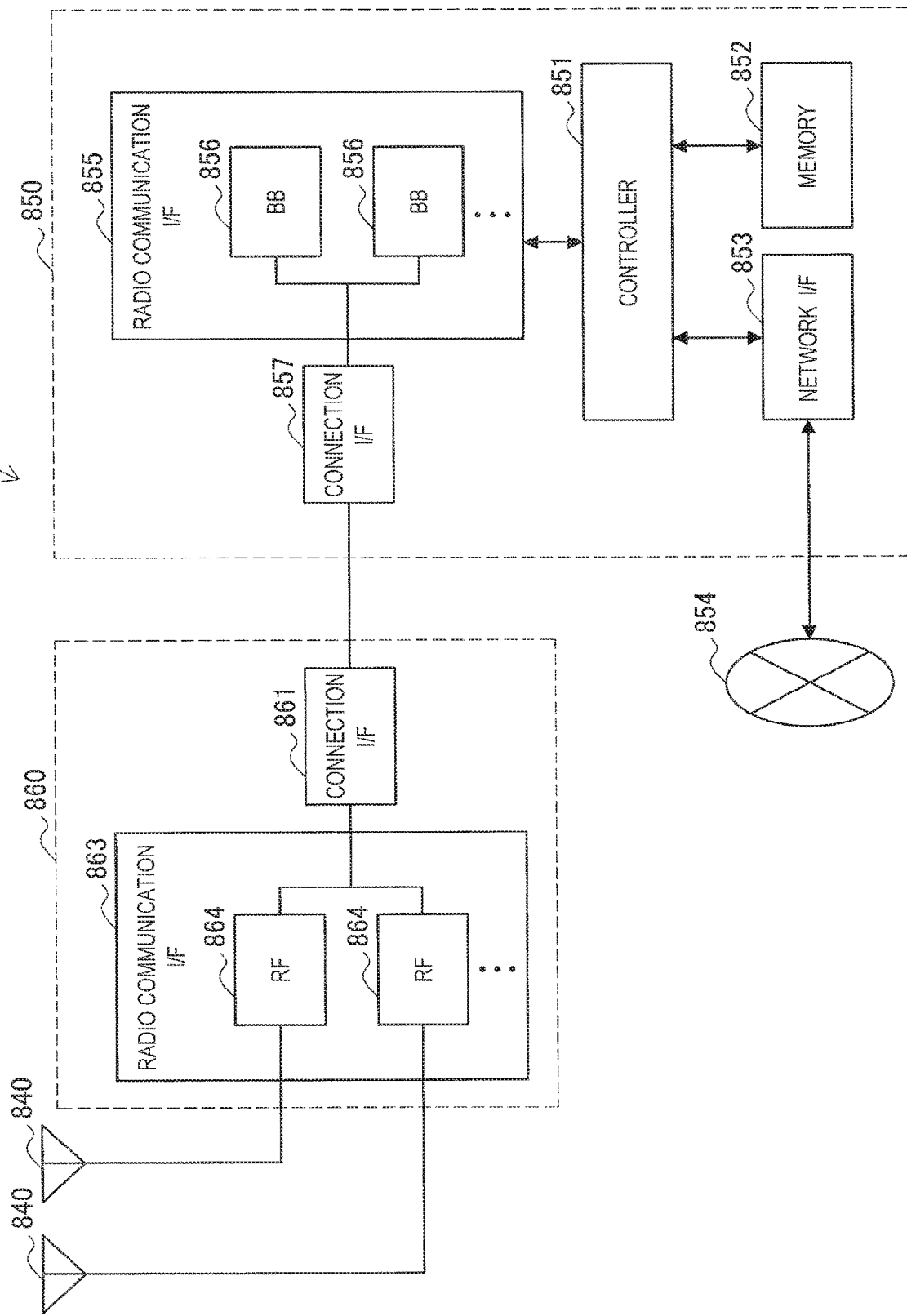
FIG. 24 is a block diagram illustrating a second example of a schematic configuration of an eNB.

FIG. 24 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as optical fiber cable.

Each of the antennas 840 includes a single or multiple antenna elements (such as multiple antenna elements included in an MIMO antenna), and is used for the RRH 860 to transmit and receive wireless signals. The eNB 830 may include the multiple antennas 840, as illustrated in FIG. 24. For example, the multiple antennas 840 may be compatible with multiple frequency bands used by the eNB 830. Although FIG. 24 illustrates the example in which the eNB 830 includes the multiple antennas 840, the eNB 830 may also include a single antenna 840.

The base station apparatus 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 23.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 23, except the BB processor 856 is connected to the RF circuit 864 of the RRH 860 via the connection interface 857. The wireless communication interface 855 may include the multiple BB processors 856, as illustrated in FIG. 24. For example, the multiple BB processors 856 may be compatible with multiple frequency bands used by the eNB 830. Although FIG. 24 illustrates the example in which the wireless communication interface 855 includes the multiple BB processors 856, the wireless communication interface 855 may also include a single BB processor 856.

The connection interface 857 is an interface for connecting the base station apparatus 850 (wireless communication interface 855) to the RRH 860. The connection interface 857 may also be a communication module for communication in the above-described high speed line that connects the base station apparatus 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station apparatus 850. The connection interface 861 may also be a communication module for communication in the above-described high speed line.

The wireless communication interface 863 transmits and receives wireless signals via the antenna 840. The wireless communication interface 863 may typically include, for example, the RF circuit 864. The RF circuit 864 may include, for example, a mixer, a filter, and an amplifier, and transmits and receives wireless signals via the antenna 840. The wireless communication interface 863 may include multiple RF circuits 864, as illustrated in FIG. 24. For example, the multiple RF circuits 864 may support multiple antenna elements. Although FIG. 24 illustrates the example in which the wireless communication interface 863 includes the multiple RF circuits 864, the wireless communication interface 863 may also include a single RF circuit 864.

In the eNB 830 shown in FIG. 24, the one or more components (information acquisition unit 251, information providing unit 253, assignment judgment unit 255, resource assignment unit 257, and/or communication control unit 259) included in the processing unit 250 described with reference to FIG. 8 may be implemented in the wireless communication interface 855 and/or the wireless communication interface 863. Alternatively, at least part of these components may be implemented in the controller 851. As an example, the eNB 830 incorporates part (for example, the BB processor 856) or an entirety of the wireless communication interface 855, and/or a module including the controller 851, and the one or more components may be implemented in the module. In this case, the module may store a program for allowing the processor to function as the one or more components (in other words, a program for allowing the processor to execute the operation of the one or more components), and may execute the program. As another example, a program for allowing the processor to function as the one or more components may be installed in the eNB 830, and the wireless communication interface 855 (for example, the BB processor 856) and/or the controller 851 may execute the program. As described above, as an apparatus including the one or more components, the eNB 830, the base station apparatus 850 or the module may be provided, and the program for allowing the processor to function as the one or more components may be provided. Further, a readable medium recording the program therein may be provided.

Furthermore, in the eNB 830 shown in FIG. 24, for example, the wireless communication unit 220 described with reference to FIG. 8 may be implemented in the wireless communication interface 863 (for example, the RF circuit 864). Further, the antenna unit 210 may be implemented in the antenna 840. Further, the network communication unit 230 may be implemented in the controller 851 and/or the network interface 853.

<7-3. Application Examples Regarding UE>

First Application Example

Figure 25:
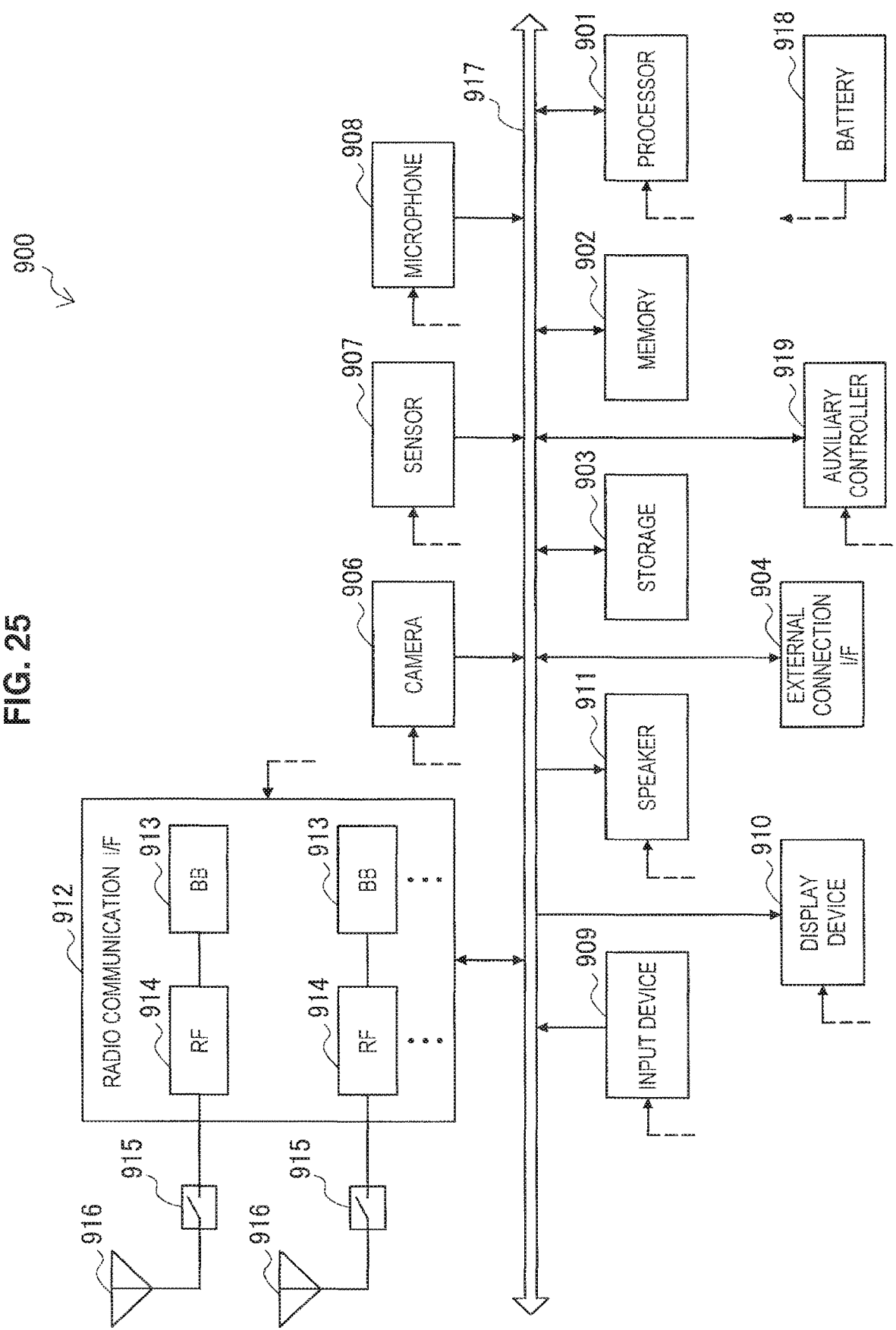
FIG. 25 is a block diagram illustrating an example of a schematic configuration of a smartphone.

FIG. 25 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls functions of an application layer and another layer of the smartphone 900. The memory 902 includes a RAM and a ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch and the like, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives wireless signals via the antenna 916. The wireless communication interface 912 may also be a one chip module that has the BB processor 913 and the RF circuit 914 integrated thereon. The wireless communication interface 912 may include the multiple BB processors 913 and the multiple RF circuits 914, as illustrated in FIG. 25. Although FIG. 25 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive wireless signals. The smartphone 900 may include the multiple antennas 916, as illustrated in FIG. 25. Although FIG. 25 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 25 via feeder lines, which are partially shown as dashed lines in the figure. The auxiliary controller 919 operates minimum necessary functions of the smartphone 900, for example, in a sleep mode.

In the smartphone 900 shown in FIG. 25, the one or more components (information acquisition unit 361, information providing unit 363, and/or communication control unit 365) included in the processing unit 360 described with reference to FIG. 9 may be implemented in the wireless communication interface 912. Alternatively, at least part of these components may be implemented in the processor 901 or the auxiliary controller 919. As an example, the smartphone 900 incorporates part (for example, the BB processor 913) or an entirety of the wireless communication interface 912, and/or a module including the processor 901 and/or the auxiliary controller 919, and the one or more components may be implemented in the module. In this case, the module may store a program for allowing the processor to function as the one or more components (in other words, a program for allowing the processor to execute the operation of the one or more components), and may execute the program. As another example, a program for allowing the processor to function as the one or more components may be installed in the smartphone 900, and the wireless communication interface 912 (for example, the BB processor 913), the processor 901, and/or the auxiliary controller 919 may execute the program. As described above, as an apparatus including the one or more components, the smartphone 900, or the module may be provided, and the program for allowing the processor to function as the one or more components may be provided. Further, a readable medium recording the program therein may be provided.

Furthermore, in the smartphone 900 shown in FIG. 25, for example, the wireless communication unit 320 described with reference to FIG. 9 may be implemented in the wireless communication interface 912 (for example, the RF circuit 914). Further, the antenna unit 310 may be implemented in the antenna 916.

Second Application Example

Figure 26:
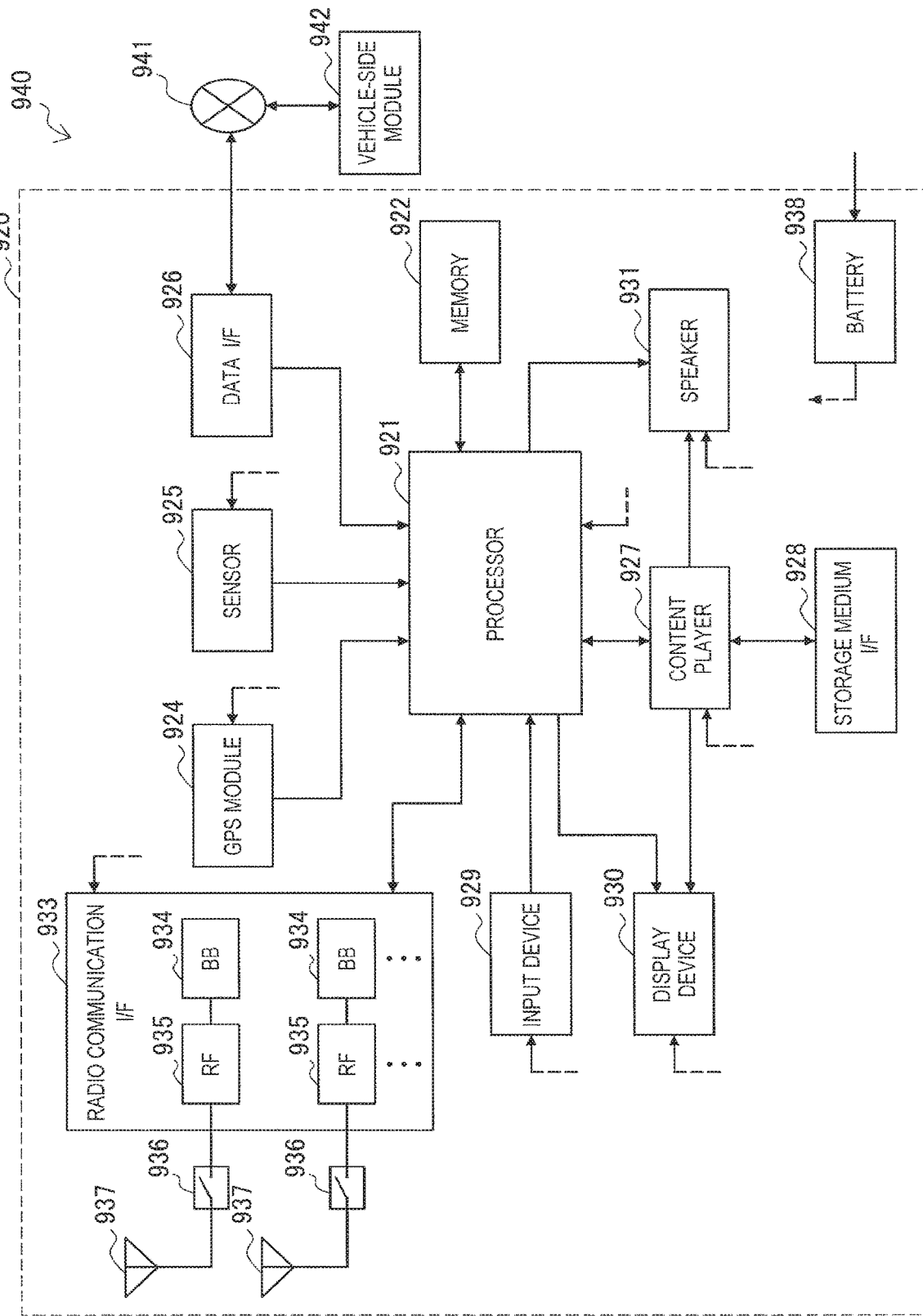
FIG. 26 is a block diagram illustrating an example of a schematic configuration of a car navigation apparatus.

FIG. 26 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation apparatus 920. The memory 922 includes a RAM and a ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch and the like, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LTE and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives wireless signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 26. Although FIG. 26 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive wireless signals. The car navigation apparatus 920 may include the multiple antennas 937, as illustrated in FIG. 26. Although FIG. 26 illustrates the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In that case, the antenna switches 936 may be omitted from the configuration of the car navigation apparatus 920.

The battery 938 supplies power to blocks of the car navigation apparatus 920 illustrated in FIG. 26 via feeder lines that are partially shown as dashed lines in the figure. The battery 938 accumulates power supplied from the vehicle.

In the car navigation apparatus 920 shown in FIG. 26, the one or more components (information acquisition unit 361, information providing unit 363, and/or communication control unit 365) included in the processing unit 360 described with reference to FIG. 9 may be implemented in the wireless communication interface 933. Alternatively, at least part of these components may be implemented in the processor 901. As an example, the car navigation apparatus 920 incorporates part (for example, the BB processor 934) or an entirety of the wireless communication interface 933, and/or a module including the processor 921, and the one or more components may be implemented in the module. In this case, the module may store a program for allowing the processor to function as the one or more components (in other words, a program for allowing the processor to execute the operation of the one or more components), and may execute the program. As another example, a program for allowing the processor to function as the one or more components may be installed in the car navigation apparatus 920, and the wireless communication interface 933 (for example, the BB processor 934), and/or the processor 921 may execute the program. As described above, as an apparatus including the one or more components, the car navigation apparatus 920, or the module may be provided, and the program for allowing the processor to function as the one or more components may be provided. Further, a readable medium recording the program therein may be provided.

Furthermore, in the car navigation apparatus 920 shown in FIG. 26, for example, the wireless communication unit 320 described with reference to FIG. 9 may be implemented in the wireless communication interface 933 (for example, the RF circuit 935). Further, the antenna unit 310 may be implemented in the antenna 937.

The technology of the present disclosure may also be realized as an in-vehicle system (or a vehicle) 940 including one or more blocks of the car navigation apparatus 920, the in-vehicle network 941, and a vehicle module 942. That is, as an apparatus including the one or more components (information acquisition unit 361, information providing unit 363 and/or communication control unit 365), the in-vehicle system (or the vehicle) 940 may be provided. The vehicle module 942 generates vehicle data such as vehicle speed, engine speed, and trouble information, and outputs the generated data to the in-vehicle network 941.

8. SUMMARY

Up to here, the communication apparatus and each processing of an embodiment according to the present disclosure have been described by using FIG. 1 to FIG. 24.

Statistical Information

According to an embodiment according to the present disclosure, the statistical information related to a channel state according to a position in the cell 20 is generated on the basis of the channel-related information related to a channel state of the UE 300 located within the cell 20, and the position-related information related to a position of the UE 300. The assignment of the wireless resource in the cell 20 is then performed on the basis of the statistical information.

For example, this can possibly eliminate the need for acquiring new channel-related information. Accordingly, it becomes possible to reduce a frequency of providing the channel-related information by the UE 300. That is, it becomes possible to further reduce the amount of the control information transmitted/received within the cell 20. As a result, the system capacity, throughput and the like of the communication system 1 can be increased.

Furthermore, for example, the statistical information includes the region statistical information related to a channel state in each region included in the cell 20.

Since a propagation path, reception power, or the like of a wireless wave is changed depending on a position within the cell 20, the channel state may largely differ depending on the position within the cell 20. Therefore, the generation of the region statistical information provides the statistical information relating to the channel state according to the position. That is, the statistical information having higher reliability is obtained. Therefore, for example, it becomes possible to more properly assign the wireless resource on the basis of the statistical information, or to more frequently assign the wireless resource on the basis of the statistical information. Moreover, the finer the granularity of the region, the higher the reliability of the statistical information.

Reliability Information

Furthermore, for example, the reliability information related to reliability of the statistical information is further generated. This makes it possible to properly judge whether or not the assignment of the wireless resource based on the statistical information is performed.

Furthermore, for example, the reliability information includes the region reliability information related to reliability of each region statistical information included in the statistical information.

This makes it possible to judge whether or not the assignment of the wireless resource based on the statistical information is performed for each region. As a result, it becomes possible to perform the assignment having higher reliability.

Furthermore, for example, the reliability information is updated on the basis of the feedback information on the wireless communication performed according to the assignment of the wireless resource based on the statistical information.

For example, this improves the accuracy of the reliability information. As a result, it becomes possible to more properly judge whether or not the assignment of the wireless resource based on the statistical information is performed.

Execution Judgment

Furthermore, for example, it is judged whether the assignment of the wireless resource in the cell 20 based on the statistical information is performed.

Furthermore, for example, it is judged whether the assignment based on the statistical information is performed based on a traffic amount.

The judgment based on the traffic amount in this manner allows the assignment of the wireless resource based on the statistical information to be performed, for example, when the traffic amount is large. Therefore, when the traffic amount is large, it becomes possible to further reduce the amount of the control signal (channel-related information) transmitted/received within the cell 20. That is, when the traffic amount is large, it becomes possible to use more wireless resources for transmission/reception of data.

Furthermore, for example, it is judged whether the assignment based on the statistical information is performed based on a movement state of the UE 300.

The judgment based on a movement state of the UE 300 in this manner allows the assignment of the wireless resource based on the statistical information to be performed, for example, when the UE 300 does not move significantly. In other words, when a channel state for the UE 300 does not significantly change (that is, the statistical information is especially useful), the assignment of the wireless resource based on the statistical information is performed. Therefore, it becomes possible to further reduce the amount of the control signal (channel-related information) provided by the UE 300 while maintaining the accuracy of the assignment of the wireless resource.

Furthermore, for example, it is judged whether the assignment based on the statistical information is performed based on the reliability information related to reliability of the statistical information.

The judgment based on the reliability information in this manner allows the assignment of the wireless resource based on the statistical information to be performed, for example, when the reliability of the statistical information is high, and prevents the assignment of the wireless resource based on the statistical information from being performed, when the reliability of the statistical information is low. Therefore, it becomes possible to further reduce the amount of the control signal (channel-related information) provided by the UE 300 while maintaining the accuracy of the assignment of the wireless resource.

Segmentation of Statistical Information in Frequency Band Division and Time Division (First Modification)

Furthermore, for example, the statistical information is generated further based on the frequency-related information related to a frequency band associated with the channel state. In this case, the statistical information is statistical information related to a channel state according to a position and a frequency band in the cell 20.

Since the frequency band determines the propagation path and the like of wireless waves, the channel state may significantly vary depending on the frequency band. Therefore, the generation of the statistical information related to the channel state corresponding to the frequency band allows the statistical information having higher reliability to be generated. Accordingly, for example, it becomes possible to more properly perform the assignment of the wireless resource, or to more frequently perform the assignment of the wireless resource on the basis of the statistical information.

Furthermore, for example, the statistical information is generated further based on the time-related information related to a time of the measurement of the channel state. In this case, the statistical information is statistical information related to a channel state according to a position and a time (and a frequency band) in the cell 20.

The channel state may vary depending on the time. Therefore, the generation of the statistical information related to the channel state according to the time allows the statistical information having higher reliability to be generated. Accordingly, for example, it becomes possible to more properly perform the assignment of the wireless resource, or to more frequently perform the assignment of the wireless resource on the basis of the statistical information.

Second Modification (Arrangement of Macro Cell and Small Cell)

Furthermore, for example, it may be judged for the UE 300 by using the macro cell statistical information and the small cell statistical information, which of the macro cell 20A and the small cell 20B the assignment of the wireless resource is performed in.

This allows wireless communication in a more favorable channel state. As a result, the system capacity, throughput and the like can be increased in the communication system 1 as a whole.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the example in which the channel-related information is a portion or an entirety of the channel-related information (CSI) has been described, but the present disclosure is not limited thereto. For example, the channel-related information may include other information related to a channel state (the RSRP, RSRQ, or the like), in place of a portion or an entirety of the CSI, or along with a portion or an entirety of the CSI.

Furthermore, the example in which the position-related information (position information) is provided by the UE has been described, but the present disclosure is not limited thereto. The position-related information may be acquired by the eNB through tracking of a position of the UE by the eNB. Further, the frequency-related information (frequency band information) and the time-related information (time information) may be not acquired by the UE, but acquired by the eNB autonomously.

Furthermore, there have been described the generation of the statistical information related to a channel state according to a position, and also the generation of the statistical information related to a channel state according to a frequency band and/or a time, but the present disclosure is not limited thereto. Further, the statistical information segmented from another viewpoint may be generated. As an example, the statistical information related to a channel state according to weather or climate may be generated.

Furthermore, the example in which the reliability information related to reliability of the statistical information is generated in the unit of the region within the cell (that is, the region reliability information is generated) has been described, but the present disclosure is not limited thereto. For example, the reliability information may be information related to reliability of the whole statistical information including the region statistical information for each region. In this case, the execution judgment of the assignment of the wireless resource based on the statistical information may be performed based on the reliability information not in the UE unit but in the cell unit.

Furthermore, the example in which the NE generates the statistical information has been described, but the present disclosure is not limited thereto. For example, each eNB, instead of the NE 100, may generate the statistical information. Further, when the macro cell and the small cell are arranged, the eNB of the macro cell may generate both the macro cell statistical information and the small cell statistical information, and may provide the small cell statistical information for the eNB of the small cell.

Furthermore, as a principle, the example in which the eNB judges whether the assignment of the wireless resource based on the statistical information is performed, but the present disclosure is not limited thereto. For example, the NE, instead of the eNB, may judge whether the assignment of the wireless resource based on the statistical information is performed. Further, when the macro cell and the small cell are arranged, the eNB of the macro cell may not only judge whether the assignment of the wireless resource based on the statistical information in the macro cell is performed, but also judge whether the assignment of the wireless resource based on the statistical information in the small cell is performed. In these cases, the assignment of the wireless resource based on the statistical information may be judged at a level of the communication system as a whole including the macro cell and the small cell, on the basis of the traffic of the communication system as a whole including the macro cell and the small cell.

Furthermore, the example in which the eNB performs the assignment of the wireless resource has been described, but the present disclosure is not limited thereto. For example, the NE, instead of the eNB, may perform by using the macro cell statistical information and the small cell statistical information the assignment of the wireless resource. Then, the NE may notify the eNB of the resource assignment information.

Furthermore, the example in which the NE is implemented as a communication node different from the eNB has been described, but the present disclosure is not limited thereto. For example, the NE may be implemented in each eNB. Further, as another example, the NE may be implemented in the eNB representing the plurality of eNBs. In this case, the representative eNB may function as the NE for other eNBs while functioning as the NE for its own apparatus.

For example, the eNB has been described as one communication control apparatus, but the present disclosure is not limited thereto. The eNB may include a plurality of apparatuses. For example, the eNB may include an antenna device including an antenna unit, a wireless communication device including a wireless communication unit, and a communication control apparatus including a storage unit and a processing unit.

The example in which the eNB of a small cell is an independent complete base station has been described, but the present disclosure is not limited thereto. For example, the eNB of a small cell may be a remote wireless head (RRH). The RRH may mainly include an analog signal processing portion and an antenna portion and may be extended from a device (for example, a macro eNB) in a remote place using an optical fiber. In this case, a communication control function (information acquisition unit and a communication control unit) for a small cell (pico cell) may be mounted onboard the device (for example, a macro eNB) in the remote place.

The example in which the communication system is a system conforming to LTE or LTE-A has been described, but an embodiment of the present disclosure is not limited thereto. For example, the communication system may be a system conforming to another communication standard. In this case, the UE may be another terminal device and the eNB may be another base station.

Also, the processing steps in a communication control process in this specification are not strictly limited to being executed in a time series following the sequence described in a flowchart. For example, the processing steps in a communication control process may be executed in a sequence that differs from a sequence described herein as a flowchart, and furthermore may be executed in parallel.

A computer causing the processor (for example, a CPU or a DSP) included in the devices (for example, the NB, the eNB, or the UE) of the present specification to function as the components (for example, the information acquisition unit and statistical information generation unit) of the device program (in other words, a computer program causing the processor to execute the operations of the components of the device) can also be created. A recording medium that records the computer program may also be provided. A device (for example, a finished product or a module (a component, a processing circuit, or a chip, or the like) for a finished product) including a memory storing the computer program and one or more processors capable of executing the computer program may also be provided. A method including the operations of the components (for example, the information acquisition unit and statistical information generation unit) of the device may also be included in a technology according to an embodiment of the present disclosure.

Moreover, the present technology may also be configured as below.

(1)

A communication control apparatus including: an acquisition unit configured to acquire channel-related information related to a channel state of a terminal apparatus located within a cell, and position-related information related to a position of the terminal apparatus; and a generation unit configured to generate statistical information related to the channel state according to the position in the cell on the basis of the channel-related information and the position-related information, wherein the statistical information is information used for assignment of a wireless resource in the cell.

(2)

The communication control apparatus according to (1), wherein the channel-related information includes first channel-related information related to a channel state of a terminal apparatus located within a macro cell, and second channel-related information related to a channel state of a terminal apparatus located within a small cell partially or entirely overlapped with the macro cell, the position-related information includes first position-related information related to a position of the terminal apparatus located within the macro cell, and second position-related information related to a position of the terminal apparatus located within the small cell, and the statistical information includes first statistical information related to the channel state according to the position in the macro cell, and second statistical information related to the channel state according to the position in the small cell, and is information used for assignment of a wireless resource in the macro cell and the small cell.

(3)

The communication control apparatus according to (2), wherein the first statistical information and the second statistical information are information used for judging which of the macro cell and the small cell the assignment of the wireless resource is performed in for the terminal apparatus.

(4)

The communication control apparatus according to any one of (1) to (3), wherein the acquisition unit further acquires frequency-related information related to a frequency band associated with the channel state, the generation unit generates the statistical information further on the basis of the frequency-related information, and the statistical information is statistical information related to the channel state according to a frequency band and a position in the cell.

(5)

The communication control apparatus according to any one of (1) to (4), wherein the acquisition unit further acquires time-related information related to a time of measurement of the channel state, the generation unit generates the statistical information further on the basis of the time-related information, and the statistical information is statistical information related to the channel state according to a time and a position in the cell.

(6)

The communication control apparatus according to any one of (1) to (5), wherein the cell includes a plurality of regions each including one or more positions within the cell, and the statistical information includes region statistical information related to a channel state in each region included in the cell.

(7)

The communication control apparatus according to (6), wherein the generation unit generates the region statistical information on the basis of a probability distribution of the channel-related information corresponding to each region included in the cell.

(8)

The communication control apparatus according to any one of (1) to (7), wherein the generation unit further generates reliability information related to reliability of the statistical information.

(9)

The communication control apparatus according to (8), wherein the cell includes a plurality of regions each including one or more positions within the cell, the statistical information includes region statistical information related to a channel state in each region included in the cell, and the reliability information includes region reliability information related to reliability of each region statistical information included in the statistical information.

(10)

The communication control apparatus according to (8) or (9), wherein the generation unit generates the reliability information by using dispersion related to the channel-related information used for generating the statistical information.

(11)

The communication control apparatus according to any one of (8) to (10), wherein the generation unit updates the reliability information on the basis of feedback information on wireless communication performed according to the assignment.

(12)

The communication control apparatus according to (11), wherein the feedback information includes information indicating success or failure of the wireless communication, and the generation unit updates the reliability information in order to make the reliability of the statistical information higher when the feedback information indicates success of the wireless communication, or the reliability of the statistical information lower when the feedback information indicates failure of the wireless communication.

(13)
A communication control method including:
acquiring channel-related information related to a channel state of a terminal apparatus located within a cell, and position-related information related to a position of the terminal apparatus; and
generating statistical information related to the channel state according to the position in the cell on the basis of the channel-related information and the position-related information,
wherein the statistical information is information used for assignment of a wireless resource in the cell.

(14)
A communication control apparatus including:
an acquisition unit configured to acquire statistical information related to a channel state according to a position in a cell; and
an assignment unit configured to perform assignment of a wireless resource in the cell on the basis of the statistical information.

(15)
The communication control apparatus according to (14),
wherein the statistical information is information generated on the basis of a channel-related information related to a channel state of a terminal apparatus located within the cell, and a position-related information related to a position of the terminal apparatus.

(16)
The communication control apparatus according to (14) or (15),
wherein the assignment unit performs the assignment on the basis of the statistical information when it is judged that the assignment based on the statistical information is performed.

(17)
The communication control apparatus according to (16),
wherein whether the assignment based on the statistical information is performed is judged based on a traffic amount.

(18)
The communication control apparatus according to (16) or (17),
wherein whether the assignment based on the statistical information is performed is judged based on a movement state of a terminal apparatus.

(19)
The communication control apparatus according to any one of (16) to (18),
wherein the acquisition unit further acquires reliability information related to reliability of the statistical information, and
whether the assignment based on the statistical information is performed is judged based on the reliability information.

(20)
A communication control method including:
acquiring statistical information related to a channel state according to a position in a cell; and
performing assignment of a wireless resource in the cell on the basis of the statistical information.

(21)
A terminal apparatus including:
an acquisition unit configured to acquire channel-related information related to a channel state of the terminal apparatus when the terminal apparatus is located within a cell, and position-related information related to a position of the terminal apparatus; and
a providing unit configured to provide a base station with the channel-related information and the position-related information,
wherein the channel-related information and the position-related information are information used for generating statistical information related to the channel state according to the position in the cell, and
the statistical information is information used for assignment of a wireless resource in the cell.

(22)
An information processing apparatus configured to control a terminal apparatus, the information processing apparatus including:
a memory configured to store a predetermined program; and
one or more processors capable of executing the predetermined program,
wherein the predetermined program is a program for
acquiring channel-related information related to a channel state of the terminal apparatus when the terminal apparatus is located within a cell, and position-related information related to a position of the terminal apparatus, and
providing a base station with the channel-related information and the position-related information,
the channel-related information and the position-related information are information used for generating statistical information related to the channel state according to the position in the cell, and
the statistical information is information used for assignment of a wireless resource in the cell.

REFERENCE SYMBOLS LIST

1 communication system
20 cell
20A macro cell
20B small cell
100 network entity (NE)
131 information acquisition unit
133 statistical information generation unit
200 evolved node B (eNB)
251 information acquisition unit
257 resource assignment unit
300 UE
361 information acquisition unit
363 information providing unit

The invention claimed is:
1. A communication apparatus comprising:
circuitry configured to
acquire first channel-related information related to a first frequency band in a first coverage area of a first base station, second channel-related information related to a second frequency band in a second coverage area of a second base station, first position-related information related to a position of a terminal apparatus in the first coverage area, and second position-related information related to the position of the terminal apparatus in the second coverage area, wherein the second coverage area at least partially overlaps the first coverage area;
generate statistical information from a probability distribution of the first and second channel-related information for a region in the first coverage area, wherein the region is determined from the first and second position-related information; and assign wireless resources of the first base station and the second base station to the terminal apparatus using the statistical information.

2. The communication apparatus of claim 1, wherein the circuitry is further configured to acquire the channel-related information from at least one of the first base station, the second base station, or a user equipment (UE).

3. The communication apparatus of claim 1, wherein the circuitry is further configured to assign the wireless resources using a traffic amount.

4. The communication apparatus of claim 1, wherein the circuitry is further configured to assign the wireless resources using a traffic amount, if a judgement is made that the traffic amount exceeds a predetermined threshold.

5. The communication apparatus of claim 1, wherein the wireless resources assigned to the first base station and the wireless resources assigned to the second base station are different.

6. The communication apparatus of claim 1, wherein the first base station comprises the communication apparatus.

7. A method of communicating in a network comprising a first base station, a second base station, and a user equipment (UE), the method comprising:
acquiring first channel-related information related to a first frequency band in a first coverage area of the first base station, second channel-related information related to a second frequency band in a second coverage area of a second base station, first position-related information related to a position the UE in the first coverage area, and second position-related information related to the position of the UE in the second coverage area, wherein the second coverage area at least partially overlaps the first coverage area;
generating statistical information from a probability distribution of the first and second channel-related information for a region in the first coverage area, wherein the region is determined from the first and second position-related information; and
assigning wireless resources of the first base station and the second base station to the UE using the statistical information.

8. The method of communicating of claim 7, wherein the channel-related information is acquired from at least one of the first base station, the second base station, or the UE.

9. The method of communicating of claim 7, further comprising:
assigning the wireless resources using a traffic amount.

10. The method of communicating of claim 7, further comprising:
judging whether a traffic amount exceeds a predetermined threshold; and
assigning the wireless resources using a traffic amount, if the predetermined threshold is exceeded.

11. The method of communicating of claim 7, wherein the wireless resources assigned to the first base station and the wireless resources assigned to the second base station are different.

* * * * *